Ｕnited States Patent [19]

Hirai

[11] Patent Number: 5,862,384
[45] Date of Patent: Jan. 19, 1999

[54] COMPILER OPTIMIZER THAT MOVES LOOP INVARIANT EXPRESSIONS

[75] Inventor: Shinji Hirai, Kanagawa, Japan

[73] Assignee: NEC Corporation, Tokyo, Japan

[21] Appl. No.: 783,061

[22] Filed: Jan. 15, 1997

[30] Foreign Application Priority Data

Jan. 17, 1996 [JP] Japan .................................... 8-005908

[51] Int. Cl.⁶ ...................................................... G06F 9/45
[52] U.S. Cl. ............................................................ 395/209
[58] Field of Search ................................. 395/705, 708, 395/709, 707

[56] References Cited

U.S. PATENT DOCUMENTS 5,396,627  3/1995  Itsuka ....................................... 395/700

FOREIGN PATENT DOCUMENTS 1-121938  5/1989  Japan .
1-214936  8/1989  Japan .

OTHER PUBLICATIONS

"Turbo C" User's Guide pp. 324–328.
Aho et al., "Compilers Principles, Techniques, and Tools" *Addison–Wesley Publishing Company* pp. 639–660.
M. Harrold, et al, "Computation of Interprocedural Definition and Use Dependencies," 1990 International Conference on Computer Languages, Mar. 12–15, 1990; pp. 297–306.

S. Richardson et al., "Code Optimization Across Procedures," Computer, No. 2, Feb. 1989; pp. 42–50.

S. Richardson et al., "Interprocedural Optimization: Experimental Results," Software—Practice and Experience, vol. 19(2), Feb. 1989; pp. 149–169.

Eiho et al., "Compiler (Information Processing Series 7)", pp. 5–7 and 398–429, 1986.

*Primary Examiner*—James P. Trammell
*Assistant Examiner*—Peter J. Colcolan, III
*Attorney, Agent, or Firm*—Foley & Lardner

[57] ABSTRACT

A compiler optimizing device provided with an optimizing section comprising an update variable control table to control the update variables to be changed in relation to the functions contained in the loop invariant expression, an update variable extraction section to extract the update variables for each function contained in the loop invariant expression for registration to the update variable control table, an update variable review section to register the variables which are, when a certain function in the loop invariant expression calls another function, updated by the called function to the update variable control table as the update variables of the calling function, and a reference loop invariant expression transfer section to transfer the loop invariant expressions out of the loop based on the update variables recognized in access with the update variable control table.

12 Claims, 25 Drawing Sheets

FIG. 2

UPDATE VARIANT CONTROL TABLE 300

| POSITION (301) | FUNCTION NAME (302) | VARIABLE NAME (303) | CALL FUNCTION NAME (304) |
|---|---|---|---|
| 1 | FUNCTION 1 | ASSIGNMENT DESTINATION VARIABLE NAME | CALL FUNCTION NAME |
| 2 | FUNCTION 2 | ⋮ | ⋮ |
| ⋮ | ⋮ | ⋮ | ⋮ |
| n | FUNCTION n | ⋮ | ⋮ |

FIG. 16

UPDATE VARIANT CONTROL TABLE 310

| POSITION (311) | FUNCTION NAME (312) | INTERRUPT (315) | VARIABLE NAME (313) | CALL FUNCTION NAME (314) |
|---|---|---|---|---|
| 1 | FUNCTION 1 | INTERRUPT | ASSIGNMENT DESTINATION VARIABLE NAME | FUNCTION NAME |
| 2 | FUNCTION 2 | ⋮ | ⋮ | ⋮ |
| ⋮ | ⋮ | ⋮ | ⋮ | ⋮ |
| n | FUNCTION n | ⋮ | ⋮ | ⋮ |

FIG. 11

```
int  a, b, c, d, e, f, g, h, i;     —1101  SOURCE PROGRAM
void  main( )                        —1102
    j = 10;                          —1103
                                     —1104
                                     —1105  LOOP BLOCK
    do {                             —1106
        a = 10;                      —1107
        func1( );                    —1108
        func2( );                    —1109
        b = c + d;                   —1110
        e = a + f;                   —1111
        if (g == 5) {                —1112
            h = 4;                   —1113
        }                            —1114
        i = i - 1;                   —1115
    } while (i);                     —1116
}                                    —1117
void  func1() {                      —1118
    g = g + 1;                       —1119
    func3();                         —1120
}                                    —1121
void  func2() {                      —1122
    h = h + 1;                       —1123
}                                    —1124
void  func3() {                      —1125
    f = f + 1;                       —1126
}                                    —1127
```

FIG. 12

```
                                     —1142  LOOP BLOCK
    a = 10;                          —1107
    b = c + d;                       —1110
    do {                             —1106
        func1();                     —1108
        func2();                     —1109
        e = a + f;                   —1111
        if (g == 5) {                —1112
            h = 4;                   —1113
        }                            —1114
        i = i - 1;                   —1115
    } while (i);                     —1116
```

FIG. 13

UPDATE VARIANT CONTROL TABLE 300A

| POSITION 301A | FUNCTION NAME 302A | VARIABLE NAME 303A | CALL FUNCTION NAME 304A |
|---|---|---|---|
| 1 | main | i, a, b, e, h | func 1, func 2 |
| 2 | func 1 | g | func 3 |
| 3 | func 2 | h | |
| 4 | func 3 | f | |

FIG. 14

UPDATE VARIANT CONTROL TABLE 300B

| POSITION 301B | FUNCTION NAME 302B | VARIABLE NAME 303B | CALL FUNCTION NAME 304B |
|---|---|---|---|
| 1 | main | i, a, b, e, h | |
| 2 | func 1 | g, f | |
| 3 | func 2 | h | |
| 4 | func 3 | f | |

FIG. 15

LOOP VARIABLE STATUS TABLE

| VARIABLE NAME | REFERENCE | ASSIGNMENT | CHANGE |
|---|---|---|---|
| a | 1 | 1 | |
| g | 1 | | 1 |
| f | 1 | | 1 |
| h | | 1 | ① — 1039 |
| d | 1 | | |
| c | 1 | | |
| b | | 1 | |
| e | | 1 | ① — 1040 |
| i | 1 | | ① — 1041 |

FIG. 21

```
                                          1201  SOURCE PROGRAM
int a, b, c, d, e, f, g, h, i;            1202
void main() {                             1203
    j = 10;                               1204
                                          1205  LOOP BLOCK
    do {                                  1206
        a = 10;                           1207
        b = c + d;                        1208
        e = a + f;                        1209
        if (g == 5) {                     1210
            h = 4;                        1211
        }                                 1212
        i = i - 1;                        1213
    } while (i);                          1214
}                                         1215
interrupt void func() {                   1216
    f = f + 1;                            1217
}                                         1218
```

FIG. 22

UPDATE VARIANT CONTROL TABLE        310A

| POSITION (311A) | FUNCTION NAME (312A) | INTERRUPT (315A) | VARIABLE NAME (313A) | CALL FUNCTION NAME (314A) |
|---|---|---|---|---|
| 1 | main |   | i, a, b, e, h |   |
| 2 | func | 1 | f |   |

LOOP VARIABLE STATUS TABLE 410B

| VARIABLE NAME | REFERENCE | ASSIGNMENT | CHANGE |
|---|---|---|---|
| f | 1 |  | 1 |
| a | 1 | 1 |  |
| d | 1 |  |  |
| c | 1 |  |  |
| b |  | 1 | ① —1131 |
| e |  | 1 |  |
| g | 1 |  |  |
| h |  | 1 | ① —1132 |
| i | 1 |  | ① —1133 |

411B  412B  413B  414B

```
                              1234 LOOP BLOCK
a = 10;                       1207
b = c + d;                    1208
do {                          1206
    e = a + f;                1209
    if (g == 5) {             1210
        h = 4;                1211
    }                         1212
    i = i - 1;                1213
} while (i);                  1214
```

LOOP VARIABLE STATUS TABLE

| VARIABLE NAME | REFERENCE | ASSIGNMENT | CHANGE |
|---|---|---|---|
| | | | |
| | | | |
| | | | |
| | | | |

FIG. 31
(PRIOR ART)

```
do {                   ~1601  LOOP BLOCK
    a = 10;            —1106
    func1();           —1107
    func2();           —1108
    b = c + d;         —1109
    e = a + f;         —1110
    if (g == 5) {      —1111
        h = 4;         —1112
                       —1113
    }                  —1114
    i = i - 1;         —1115
} while (i);           —1116
```

FIG. 32
(PRIOR ART)

```
do {                   ~1701  LOOP BLOCK
    a = 10;            —1206
    b = c + d;         —1207
    e = a + f;         —1208
    if (g == 5) {      —1209
        h = 4;         —1210
                       —1211
    }                  —1212
    i = i - 1;         —1213
} while (i);           —1214
```

COMPILER OPTIMIZER THAT MOVES LOOP INVARIANT EXPRESSIONS

BACKGROUNDS OF THE INVENTION

1. Field of the Invention

The present invention relates to an optimizing device for code optimization in the compiler and particularly relates to a compiler optimizing device which makes optimization by transfer of the loop invariant expressions and the method therefor.

2. Description of the Related Art

In general, the compiler is widely used in the field of software development as the translation program for programming languages. To generate the object code with a faster execution speed, various optimization methods have been proposed. One of them is the method to move the loop invariant expressions.

Many of the programming languages allow description of repeated processes called the loop statements. In loop statements, the programmer, with attaching greater importance to the readability of the program, sometimes describes the expressions which generate the same result even after repetition in the loop, i.e. loop invariant expressions. Since it is sufficient for such invariant expressions to be processed once, they can be taken out of the loop statements. Therefore, by transferring the loop invariant expressions described in the source program by the programmer out of the loop statements during compilation, redundant repetitions are reduced and the object code with a faster execution speed can be generated. Thus, the code can be optimized by appropriately transferring the loop invariable expressions.

In programming languages, however, programs are usually designed with modules and, according to their specification, a series of processes are grouped as a functional unit called a function and such function can be arbitrarily called from the program. The conventional optimization method to move the loop invariant expressions could not recognize which variable in a function had been changed upon function call in the loop. It could not recognize the expressions with the same result after repetition in the loop, and it was impossible to move the loop invariant expressions in the loop statements including function calls.

In addition, programming languages allow description of branch execution with conditional expressions called the conditional statements. However, such description may include branch processing which is not executed depending on the condition and, usually, the expressions in the conditional statements are not transferred.

A conventional optimization method which optimizes the code by transferring the loop invariant expressions as mentioned above is, for example, disclosed in the reference "Compiler (Information Processing Series 7)" (written by A. V. Eiho and J. D. Urman and translated by Norihisa Doi, Baifukan, 1986, pp. 5–7 and FIGS. 1 and 2). FIG. 25 is a block diagram to show the configuration of an optimizing device which embodies the conventional optimization method described in the above reference.

A conventional optimizing device shown in FIG. 25 comprises a lexical analysis section 10 which decomposes the source program into lexical units, a syntactic analysis section 20 which, upon receipt of the lexical analysis result, makes syntactic analysis, an optimizing section 130 including a loop invariant expression transfer section 131 which, upon receipt of the syntactic analysis result, transfers the loop invariant expressions out of the loop, and a code generation section 70 which, upon receipt of the optimization result, generates the object code.

Next, referring to FIG. 25, the operation of a conventional compiler optimizing device is described below. The lexical analysis section 10 receives the source program supplied from outside and makes the lexical analysis to decompose such source program into lexical units. The syntactic analysis section 20 receives the lexical analysis result from the lexical analysis section 10 and constructs and recognizes the syntax. Then, the loop invariant expression transfer section 131, which is a component of the optimizing section 130, receives the syntactic analysis result, detects the invariable expressions movable in the loop i.e. the loop invariable expressions and transfers them out of the loop. Finally, the code generation section 70 receives the optimization result and generates the object code.

FIG. 27 is a flowchart to show the processing procedure of the loop invariable expression transfer section 131. Referring to the figure, the loop invariant expression transfer section 131 extracts the invariant variables from the loops, checks for any change in values caused by reference, assignment and repetition and registers the data to a loop variable status table 410 as shown in FIG. 26. Then, it detects the invariant expressions based on the data registered to such loop variable status table and transfers them out of the loops.

Referring to FIG. 26, the loop variable status table 410 generated in processing by the loop invariable expression transfer section 131 is provided with four areas: a variable name column 411 to fill in the variable names of the variables constituting the expressions in the loop statements, a reference column 412 to fill in the data indicating that the applicable variable is referenced when it is referenced (value "1", for example), an assignment column 413 to fill in the data indicating that the applicable variable is assigned when it is assigned (value "1", for example), and a change column 414 to fill in the data indicating that the value possibly changes for every repetition due to assigned variable (value "1", for example).

Then, referring to FIG. 27, the processing procedure by the loop invariant expression transfer section 131 is described below.

Firstly, a certain syntax file is opened (Step 2701). Next, a syntax for one line is read (Step 2702). Then, it is judged whether the syntax represents the end of syntax file (Step 2703). If it is the end of syntax file, the syntax file is closed and the processing is terminated (Step 2711). If it is not the end of syntax file, it is judged whether the read syntax is leading loop statements or not (Step 2704). If it is not, the processing returns to Step 2702. If it is leading loop statements, flag F to be used for identification of whether or not any function call is made in the loop statements is initialized with "0" (Step 2705).

Next, all items of the variable name column 411, the reference column 412, the assignment column 413 and the change column 414 on the loop variable status table 410 are initialized with "0" (Step 2706). Then, the variables whose values do not change even after repetition in the loop statements, i.e. the invariant variables are detected (Step 2707). At this Step, the variables constituting the expressions in the loop are checked to see whether reference or assignment is made. Necessary data are filled in to the columns for variable name 411, reference 412 and assignment 413 on the loop variable status table 410. Since a variable subjected to assignment after reference has different values for the first repetition and the repetition from the second time, the change column 414 is also filled in with the indication data.

Referring to the flowchart of FIGS. 28 and 29, the procedure of the invariant variable detection (Step 2707) is described below.

Firstly, a recognition flag I to indicate that a conditional statement is being processed is initialized with "0" (Step 2801). Next, a syntax for one line is read (Step 2802). Then, it is judged whether the read syntax represents the end of loop statements (Step 2803). If the read statement represents the end of loop statements, the invariant variable detection is terminated.

If the read statement does not represent the end of loop statements, then it is judged whether the read syntax is a function call statement (Step 2804). If it is a function call statement, the loop invariant expression cannot be moved. In this case, a flag F to indicate that a function call is made in the loop statements is set to "1" and the invariant variable detection step 280 is terminated (Step 2810).

If the read syntax is not a function call, it is judged whether the read syntax is at the beginning of conditional statements (Step 2805). If it is not at the beginning of conditional statements, processing is proceeded to Step 2806. On the other hand, if it is at the beginning of conditional statements, the expressions in the conditional statements may not be executed. In this case, after incrementing the flag I indicating that the conditional statement is being processed by "1" (Step 2811), processing is proceeded to Step 2806.

Next, it is judged whether the read syntax represents the end of conditional statements (Step 2806). If it does not represent the end of conditional statements, then the processing proceeds to Step 2807. On the other hand, if it represents the end of conditional statements, the flag I to indicate that the conditional statement is being processed is decremented by "1" before proceeding to Step 2807.

Then, a flag S to indicate that the syntax currently being processed is an expression for reference only is initialized with "0" (Step 2807) and it is judged whether or not the read syntax is an expression for reference only (Step 2808). If the expression is for reference only, it does not contain any variable for assignment. In this case, the reference expression flag S for judgment whether or not processing for assignment expression is required is set to "1" (Step 2813). In the procedure from Step 2814, data are registered to the loop variable status table 410 and the loop variable status table is arranged to fill in the data of reference, assignment and change for the variables in the expressions.

If the read syntax is not an expression for reference only, it is judged whether the read syntax is an assignment subject statement for a variable (Step 2809). If it is not an assignment subject statement for a variable, the processing returns to Step 2802. If it is an assignment subject statement for a variable, the loop variable status table is arranged in the procedure from Step 2814.

In the loop variable status table arrangement, the number of variables as the reference subjects in the assignment origin expression is set to a counter N in order to check the number of variables before the invariant variable detection (Step 2814). Then, it is judged whether the counter N has "0" (Step 2815). If it does not have "0", the N-th variable has not been subjected to the invariant variable detection. Then, it is judged whether the variable name of the N-th variable has been registered to the variable name column 411 on the loop variable status table 410 (Step 2816). If the variable name has been registered, the processing is proceeded to Step 2817. If not, the variable name of the N-th variable is registered to the variable name column 411 of the loop variable status table 410 (Step 2824) and the processing is proceeded to Step 2817. The value "1", is entered to the reference column 412 for the variable name of the N-th variable (Step 2817), the value at the counter N is decremented by "1" and the processing returns to Step 2815 (Step 2818). The above processes are repeated for the remaining variables until the counter N has "0".

If the counter N has "0", it means that there is no variable which has not been subjected to the invariant variable detection, and it is judged whether the reference expression flag S is "0" (Step 2819). If the flag S is not "0", the syntax which is currently being processed is an expression for reference only. In this case, the processing returns to Step 2802 without making any processing for an assignment statement. If the flag S is "0", it is judged whether the assignment destination variable name is registered to the variable name column 411 of the loop variable status table 410 (Step 2820). If it is registered, the processing is proceeded to Step 2821. If it is not, the variable name of the assignment destination variable is registered to the variable name column 411 on the loop variable status table 410 (Step 2825) and the processing is proceeded to Step 2821.

Next, it is judged whether the conditional statement processing flag I is "0" (Step 2821). If it is not "0", the syntax is under processing of the conditional statement. In this case, to prevent transfer of the expression, "1" is entered to the change column 414 for the variable name of the assignment destination variable on the loop variable status table 410 (Step 2826) before return to Step 2802. If the conditional statement processing flag I is "0", then it is judged whether "1" is entered to the reference column 412 or the assignment column 413 for the variable name of the assignment destination (Step 2822). If the reference column 412 or assignment column 413 has "1", such variable may have different values for the first repetition and the repetitions from the second time. To prevent transfer of the expression including the above variable, "1" is entered to the change column 414 for the variable name of the assignment destination variable (Step 2826) before return to Step 2802. If the reference 412 or assignment 413 does not have "1", then "1" is entered to the assignment column 413 for the variable name of the assignment destination variable (Step 2823) before return to Step 2802.

Until arrival at the end of loop statements, the above loop invariant variable detection procedure (Steps 2801 to 2826) is repeated. After it is repeated until the end of loop statements, the processing returns to FIG. 27 and goes to Step 2708.

After detection of invariant variables in Step 2707, it is judged whether the function call flag F is "1" (Step 2708). If the flag F is "1", the loop processing contains a function call and the invariant expression cannot be transferred. In this case, the processing returns to Step 2702. When the flag F is not "1", the reading position for the syntax file is returned to the initial position of the loop (Step 2709). Then, referring to the loop variable status table 410, the invariant expressions consisting of expressions with invariant values including the assignment destination variables of the assignment expressions containing variables whose values may change in repetitions are transferred out of the loop (Step 2710).

Referring now to the flowchart of FIG. 30, the procedure of the invariant expression transfer (Step 2710) is described below.

Firstly, a syntax for one line is read (Step 3001). Then, it is judged whether the read syntax represent the end of loop statements (Step 3002). If it represents the end of loop statements, the invariant expression transfer is terminated. If the read statement does not represent the end of loop statements, then it is judged whether the read syntax represent an assignment statement (Step 3003). If it does not represent an assignment statement, the processing returns to step 3001. On the other hand, if the read statement represent an assignment statement, the change 414 column of the loop variable status table 410 is referred to and it is judged whether the change data is "0" for all variables (Step 3004).

If the change data is "0" for all variables registered to the change column 414 of the loop variable status table 410, the result of this assignment statement does not change in repetition. The syntax of the assignment statement is transferred out of the loop statement before return to Step 3001 (Step 3005).

On the other hand, when there is a variable with a value other than "0", the value of its assignment destination variable is also changed. "1" is entered to the change column 414 corresponding to the variable name of the assignment destination variable before return to Step 3001 (Step 3006).

Until the and of loop statements, the above invariant expression transfer procedure (Steps 3001 to 3006) is repeated to move some invariant expressions. After that, the processing returns to Step 2702 in FIG. 27.

Thus, the processing by the loop invariant expression transfer section 131 is repeated until arrival at the end of syntax file.

FIGS. 31 and 32 show examples of loop invariant expression transfer results using a conventional complier to achieve optimization by transferring the loop invariant expressions as described above. FIG. 31 shows the processing result when a source program 1001 consisting of loop statements containing function calls as shown in FIG. 11 is input to a conventional complier. Referring to FIG. 31, the loop invariant expression transfer result for the loop block 1005 of the source program 1001 is a syntax 1601.

FIG. 32 shows the processing result when a source program 1101 including the definition of asynchronously operating interrupt function as shown in FIG. 21 (hereinafter referred to the asynchronous interrupt function) is input. Referring to FIG. 32, the loop invariant expression transfer result for the loop block 1105 of the source program 1101 is a syntax 1701.

When the loop invariant expressions are transferred for a source program including the definition of the asynchronous interrupt function, incorrect transfer may occur. According to the syntax 1701 as the result of loop invariant expression transfer in FIG. 32, transfer of the loop invariant expressions is suppressed here.

Note that the above loop optimization is described with referring to pages 398 to 429 of the above-mentioned reference.

When using the conventional compiler optimizing device and its method as described above, if a function call is made in the loop, the device cannot recognize which variable is changed in the function and cannot identify the invariant expressions, and the loop invariant expressions are not transferred at all. This results in a drawback that the optimization cannot be made sufficiently.

Further, when the source program contains an asynchronous interrupt function, the variables to be updated are not recognized in the invariant expression detection and the loop invariant expressions including the above variables may be incorrectly transferred out of the loop. To prevent such transfer, it is necessary to suppress the optimization by loop invariant expression transfer. This results in a drawback of a reduced optimization efficiency.

SUMMARY OF THE INVENTION

An object of the present invention is to provide a compiler optimizing device and a method therefor which can solve the above problem and, even when there are function calls in a loop or when the source program contains asynchronously operating interrupt functions, can enable proper transfer of the invariant expressions in the loop statements, which results in a highly efficient optimization and an improved execution speed of the generated object code.

According to one aspect of the invention, a compiler optimizing device having a lexical analysis means to decompose a source program into lexical units, a syntactic analysis means for syntactic analysis upon receipt of lexical analysis result, an optimizing means to optimize a code by transferring loop invariant expressions, and a code generation means to generate an object code upon receipt of optimization result, the optimizing means further comprises an update variable control means for controlling update variables to be changed in relation to functions contained in said loop invariant expression;

an update variable extraction means for extracting the updated variables of each function contained in said loop invariant expression and registering them to said update variable control means;

an update variable review means for registering variables updated by called function when a certain function in loop invariant calls another function to said update variable control means as the update variables of calling function;

a reference loop invariant expression transfer means for extracting the loop invariant expressions based on the update variables it recognized by accessing said update variable control means and transfers them out of the loop.

In the preferred construction, the update variable control means comprises a table having at least a first item to show registration position, a second item to show function name as registration subject, a third item to show all variable names as update subjects belonging to function specified by said second item and a fourth item to show names of all functions called by said function specified by the second item and relates them for registration, and the update variable extraction means, for each of the functions contained in the loop invariant expression, specifies the registration position by said first item and registers the name of the processed function to said second item with referring to said update variable control means, extracts the variable names to be updated by assignment statements in the applicable function for registration to the corresponding position of said third item on said update variable control means and, extracts the function names called by function call statements for registration to the corresponding position of said fourth item on said update variable control means.

In the preferred construction, the update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and the update review means registers, for each of called functions corresponding to the function names registered at said fourth item of said update variable control means, the variable name of the variable to be updated by said called function to the position corresponding to said calling function at said third item of said update variable control means and, deletes the function names for which the processing has been completed from said fourth item.

In another preferred construction, the update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and the reference loop invariant expression transfer means obtains, for each function contained in the loop invariant expression, status information about the variables constituting the applicable function and, when said function calls another function, refers to registration contents at said third item of said update variable control means to recognize the variables without the status information and to supplement said variables with the status information and, extracts the loop invariant expressions based on the obtained variable status information and transfers them out of the loop.

In another preferred construction, the update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and the update variable extraction means, for each of the functions contained in the loop invariant expression, specifies the registration position by said first item and registering the name of the processed function to said second item with referring to said update variable control means, registers indication information of interrupt function to said fifth item of said update variable control means if said function whose name is registered to the second item is an interrupt function, extracts the variable names to be updated by assignment statements in the applicable function for registration to the corresponding position of said third item on said update variable control means and, extracts the function names called by function call statements for registration to the corresponding position of said fourth item on said update variable control means.

Also, the update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and the reference loop invariant expression transfer means refers to registration contents at said fifth item of said update variable control means to recognize any interrupt function among those contained in the loop invariant expression and to obtain the status information about the variable having the variable name registered to said third item corresponding to the applicable function, obtains, for each function contained in the loop invariant expression, status information about the variables constituting the applicable function and, when said function calls another function, refers to the registration contents at said third item of said update variable control means to recognize the variables without the status information and to supplement said variables with the status information and, extracts the loop invariant expressions based on the obtained variable status information and transfers them out of the loop.

According to another aspect of the invention, a compiler optimization method comprising the steps of:

a lexical analysis step for to decomposing the source program into lexical units;

a syntactic analysis step for syntactic analysis upon receipt of the lexical analysis result;

an optimizing step for optimizing the code by transferring the loop invariant expressions and a code generation means to generate the object code upon receipt of the optimization result;

wherein said optimizing step further comprises a first step for extracting the update variables of each function contained in the loop invariant expression to register to an update change control means for controlling the update variables to be changed in relation to the functions contained in the loop invariant expressions, a second step to register the variables updated by the called function when a certain function in the loop invariant expression calls another function to said update variable control means as the update variables of the calling function, and a third step to extract the loop invariant expression based on the update variables recognized in access to said update variable control means and to transfer them out of the loop.

In the preferred construction, the update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and the first step to extract and register said update variables further comprises a step for specifying the registration position by said first item and to register the name of the processed function to said second item with referring to said update variable control means, a step for extracting the variable names to be updated by assignment statements in the applicable function for registration to the corresponding position of said third item on said update variable control means, and a step for further extracting the function names called by function call statements for registration to the corresponding position of said fourth item on said update variable control means.

In the preferred construction, the update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration and the second step for additional registration of said update variables further comprises a step for registering, for each of called functions corresponding to the function names registered at said fourth item of said update variable control means, the variable name of the variable to be updated by said called function to the position corresponding to said calling function at said third item of said update variable control means, and a step for deleting the function names for which the processing has been completed from said fourth item.

In the above-mentioned construction, the update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and the third step to transfer the loop invariant expressions further comprises a step for obtaining, for each function contained in the loop invariant expression, status information about the variables constituting the applicable function and, when said function calls another function, recognizing the variables without the status information by referring to the registration contents at said third item of said update variable control means and supplementing said variables with the status information, and a step for extracting the loop invariant expressions based on the obtained variable status information and transfer them out of the loop.

In another preferred construction, the update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and the first step for extraction and registration of the updated variables further comprises a step for specifying the registration position by said first item and registering the name of the processed function to said second item with referring to said update variable control means for each of the functions in the loop invariant expression, a step for registering the indication information of interrupt function to said fifth item of said update variable control means if said function whose name is registered to the second item is an interrupt function, a step for extracting the variable names to be updated by assignment statements in the applicable function for registration to the corresponding position of said third item on said update variable control means, and a step for further extracting the function names called by function call statements for registration to the corresponding position of said fourth item on said update variable control means.

Also, the update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and the third step for transfer of loop invariant expressions further comprises a step for referring to the registration contents at said fifth item of said update variable control means for recognition of any interrupt function among those contained in the loop invariant expression and obtaining of the status information about the variable having the variable name registered to said third item corresponding to the applicable function, a step for obtaining, for each function contained in the loop invariant expression, status information about the variables constituting the applicable function and, when said function calls another function, recognizing the variables without the status information by referring to the registration contents at said third item of said update variable control means and supplementing said variables with the status information, and a step for extracting the loop invariant expressions based on the obtained variable status information and transfers them out of the loop.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a diagram to show the configuration of an update variable control table according to this embodiment;

FIG. 11 is a diagram to show an example of source program to be processed in this embodiment;

FIG. 12 is a diagram to show the optimization result of the loop block in the source program of FIG. 11;

FIG. 13 is a diagram to show the update variable control table obtained from processing of the source program as shown in FIG. 11 by the update variable extraction section;

FIG. 14 is a diagram to show the update variable control table obtained from processing of the source program as shown in FIG. 11 by the update variable review section;

FIG. 15 is a diagram to show the loop variable status table obtained from the invariant variable detection by the reference loop invariant expression transfer section for the source program as shown in FIG. 11;

FIG. 16 is a diagram to show the configuration of the update variable control table for the compiler optimizing device according to another embodiment of the present invention;

FIG. 21 is a diagram to show an example of source program to be processed in this embodiment;

FIG. 22 is a diagram to show the update variable control table obtained from processing of the source program as shown in FIG. 21 by the update variable extraction section;

FIG. 31 is a diagram to show the optimization result of the loop block in the source program as shown in FIG. 11 using a conventional optimizing device; and FIG. 32 is a diagram to show the optimization result of the loop block in the source program as shown in FIG. 21 using a conventional optimizing device.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
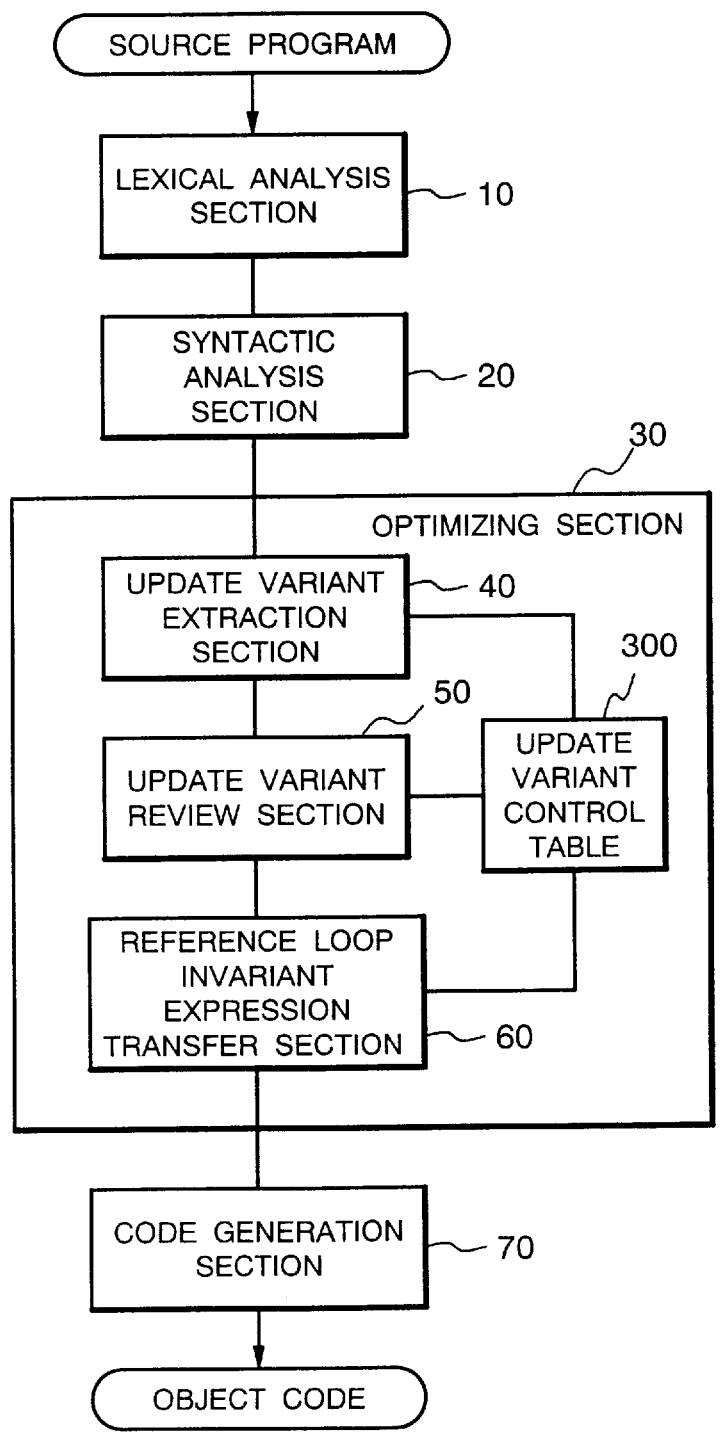
FIG. 1 is a block diagram to show the configuration of a compiler optimizing device according to an embodiment of the present invention.

FIG. 1 is a block diagram to show the configuration of a compiler optimizing device according to an embodiment of the present invention. As shown in the figure, an optimizing device of this embodiment comprises a lexical analysis section 10 which decomposes the source program into lexical units, a syntactic analysis section 20 which, upon receipt of the lexical analysis result, makes syntactic analysis, an optimizing section 30 which optimizes the code by transferring the loop invariant expressions, and a code generation section 70 which, upon receipt of the optimization result, generates the object code.

The optimizing section 30 is, as shown in the figure, provided with an update variable extraction section 40, an update variable review section 50, a reference loop invariant expression transfer section 60 and an update variable control table 300.

FIG. 2 shows the configuration of the update variable control table 300. As shown in the figure, the update variable control table 300 has four columns related each other for registration: a position column 301 to show the position of the update variable control table 300, a function name column 302 to show the name of the function for checking the names of the update subject variables and the called functions (call functions), a variable name column 303 to show the names of all variables to be updated among the functions belonging to the function name column 302, and a call function name column 304 to show all function names when there is a call for any function among those belonging to the function name column 302.

The update variable extraction section 40 extracts the variables to be updated for each function and registers them to the update variable control table 300.

The update variable review section 50 registers, when a certain function (calling function) calls another function, the variables updated by the called function to the update variable control table 300 as the variables updated by the calling function.

The reference loop invariant expression transfer section 60 refers to the update variable control table 300 and recognizes the variables updated by asynchronous interrupt functions or call functions and extracts the invariant expressions to transfer them out of the loop.

Next, referring to FIG. 1, the operation in this embodiment is described below. The lexical analysis section 10 and the syntactic analysis section 20 receive the source program applied from outside as in conventional method, make lexical analysis to decompose the source program into lexical units and construct a syntax from the lexical analysis result so as to recognize the syntax.

Upon receipt of the syntax recognition result, the optimizing section 30 firstly extracts the variables to be updated for each function using the update variable extraction section 40 so that they are registered to the update variable control table 300. Then, using the update variable review section 50, the variables updated by the called function when a certain function (calling function) A calls another function (called function) B are also registered to the update variable control table 300 as the variables updated by the calling function A. The reference loop invariant expression transfer section 60 refers to the update variable control table 300 generated by the update variable extraction section 40 and the update variable review section 50 and, according to the reference data, extracts the invariant expressions to transfer them out of the loop. Even when asynchronous interrupt functions are defined or call functions exist in the loop processing syntax, the variables updated by such asynchronous interrupt functions or call functions can be recognized by the reference to the update variable control table 300. The processing result of the optimizing section 30 is supplied to the code generation section 70.

Finally, the code generation section 70 generates, upon receipt of the optimization result from the optimizing section 30, the object code for the translation subject processor.

Next, referring to FIGS. 1 and 2 and the flowcharts of FIGS. 3 to 10, the operation of the optimizing section 30 according to this embodiment is described below.

Figure 3:
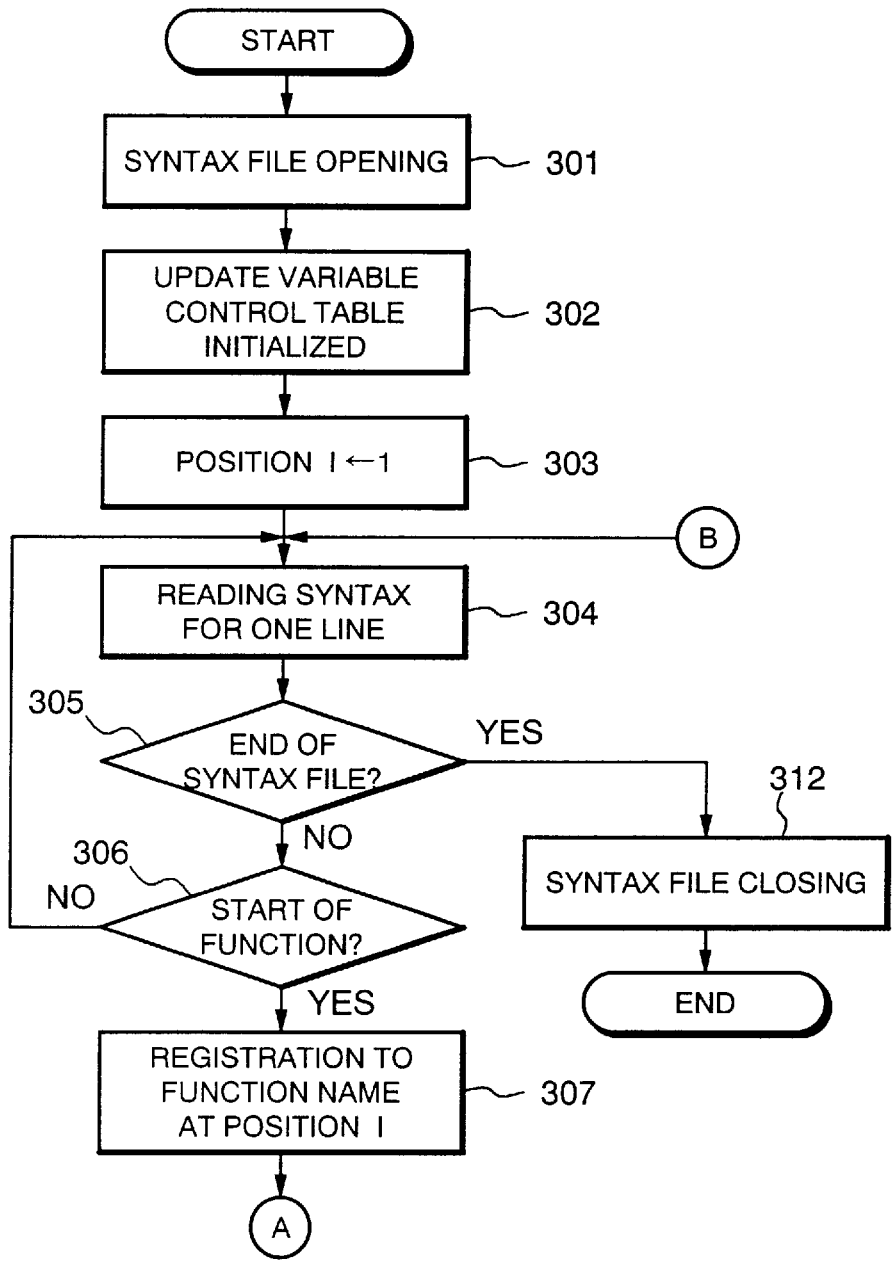
FIG. 3 is a flowchart to show the operation of the update variable extraction section of this embodiment until registration of the function names to the update variable control table.

FIG. 3 shows the procedure of the processing by the update variable extraction section 40. Referring to the figure, the update variable extraction section 40 extracts the name of the variables to be updated by the assignment statement and the name of the functions called by the function call statement for each function and registers them to the update variable control table 300.

Firstly, the syntax file indicating the syntactical analysis result by the syntactic analysis section 20 is opened so that its data can be read (Step 301). Next, all of the position column 301, the function name column 302, the variable name column 303 and the call function name column 304 on the update variable control table 300 are initialized with "0" (Step 302). Then, a variable I to set the position of the update variable control table 300 is initialized to "1" (Step 303) and a syntax for one line is read (Step 304). It is judged whether the syntax file is at the end (Step 305). If the syntax file is at the end, the syntax file is closed (Step 312) and the processing by the update variable extraction section 40 is terminated.

If the syntax file is not at the end, it is judged whether the read syntax is a function start statement (Step 306). If it is not a function start statement, the processing returns to Step 304. If it is a function start statement, the function name of the applicable function is registered to the function name column 302 corresponding to the first data of the position column 301 on the update variable control table 300 (Step 307).

Then, another syntax for one line is read (Step 308). It is judged whether the read syntax is the statement at the end of function (Step 309). If it is a statement at the end of function, the variable I is incremented by "1" and the processing returns to Step 304 (Step 313).

If it is not the end statement of function, it is judged whether the read syntax is an assignment statement (Step 310). If it is not an assignment statement, the processing is proceeded to Step 311. If it is an assignment statement, it is judged whether the name of the assignment destination variable is already registered to the variable name column 303 corresponding to the first data of the position column 301 on the update variable control table 300 (Step 314). If it is, the processing is proceeded to Step 311. If not, the name of the assignment destination variable is registered to the variable name column 303 corresponding to the first data of the position column 301 on the update variable control table 300 (Step 316) before proceeding to Step 311.

Then, it is judged whether the read syntax is a function call statement (Step 311). If not, the processing returns to Step 308. If the syntax is a function call statement, it is judged whether the name of the function call is registered to the function call name column 304 corresponding to the first data of the position column 301 on the update variable table 300 (Step 315). If it is registered, the processing returns to Step 308. If not, the call function name is registered to the call function name column 304 corresponding to the first data of the position column 301 (Step 317) before return to Step 308.

Thus, the processing by the update variable extraction section 40 is repeated until arrival at the end of the syntax file.

Figure 5:
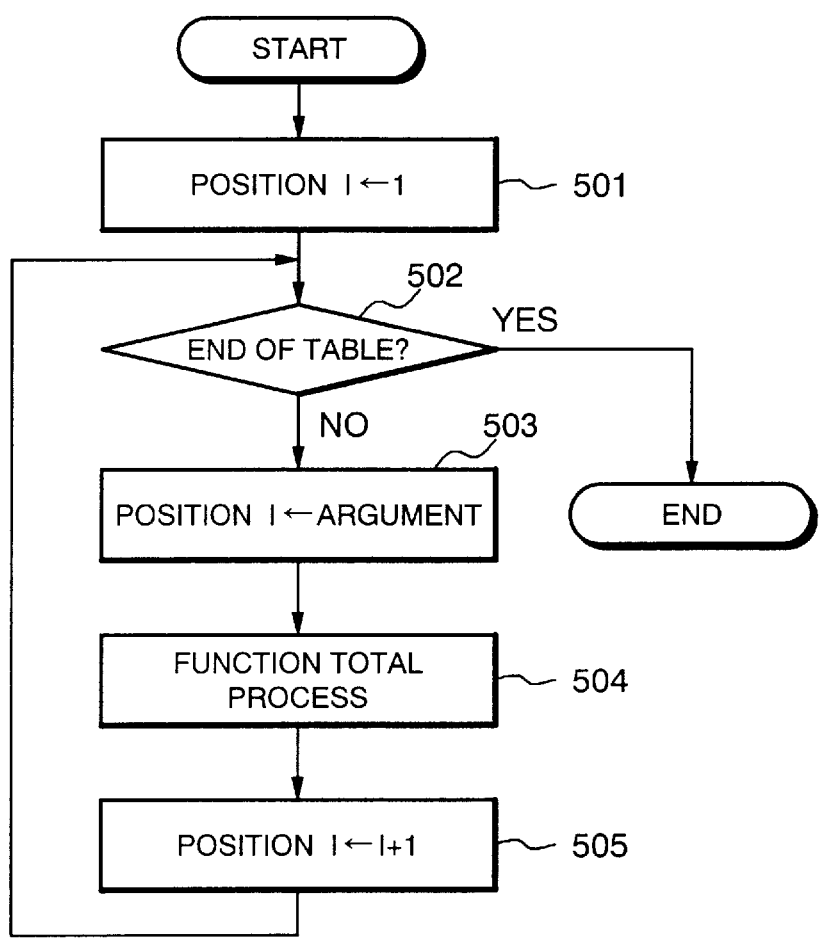
FIG. 5 is a flowchart to show the operation of the update variable review section of this embodiment.

FIG. 5 shows the procedure of the processing by the update variable review section 50. Referring to the figure, the update variable review section 50 reads the update variable control table generated by the update variable extraction section 40 and, registers the variables updated at the call destination when a function calls another function as those updated at the call origin functions so as to correct the update variable control table 300.

Firstly, the variable I to set the position of the update variable control table 300 is initialized to "1" (Step 501). Next, it is judged whether the first function name 302 at the position 301 is "0" (Step 502) If it is "0", the processing by the update variable review section 50 is terminated. If the function mane 302 is not "0", then the variable I to show the position of the update variable control table 300 is set for the argument (Step 503) so as to call the subroutine for function total processing (Step 504). After executing the function total processing as described later, the variable I indicating the position of the update variable control table 300 is incremented by 1 (Step 505) and the processing returns to Step 502.

The above procedure is repeated until the end of the update variable control table 300.

Next, referring to the flowchart of FIG. 6, the subroutine for function total processing called in Step 504 is described below.

In the subroutine for function total processing, the argument indicating the position of the update variable control table 300 is received by a variable P (Step 601). Then, the number of the function names registered to the call function name column 304 for data P of the position 301 on the update variable control table 300 is set to a counter N (Step 602).

Then, it is judged whether the counter N has "0" or not (Step 603). If the counter N has "0", the subroutine for function total processing is terminated. If the counter N has any value other than "0", the N-th call function registered to the call function name column 304 for data P of the position 301 is obtained and the value of the position 301 where such function name is registered to the function name column 302 is set to a variable J (Step 604).

The function call name registered as the N-th data of the call function name column 304 for data P of the position 301 on the update variable control table 300 is deleted (Step 605). With setting the variable J for the argument, the function total section call processing S32 is used to make a recursive procedure for the function total subroutine (Steps 606, 607).

Next, the variable name registered to the variable name column 303 corresponding to data J of the position 301 on the update variable control table 300 is additionally registered to the variable name column 303 as data P for the position 301 (Step 608). Then, the value at the counter N is decremented by 1 (Step 609) before return to Step 603.

The above procedure is repeated until the counter N has "0".

Figure 7:
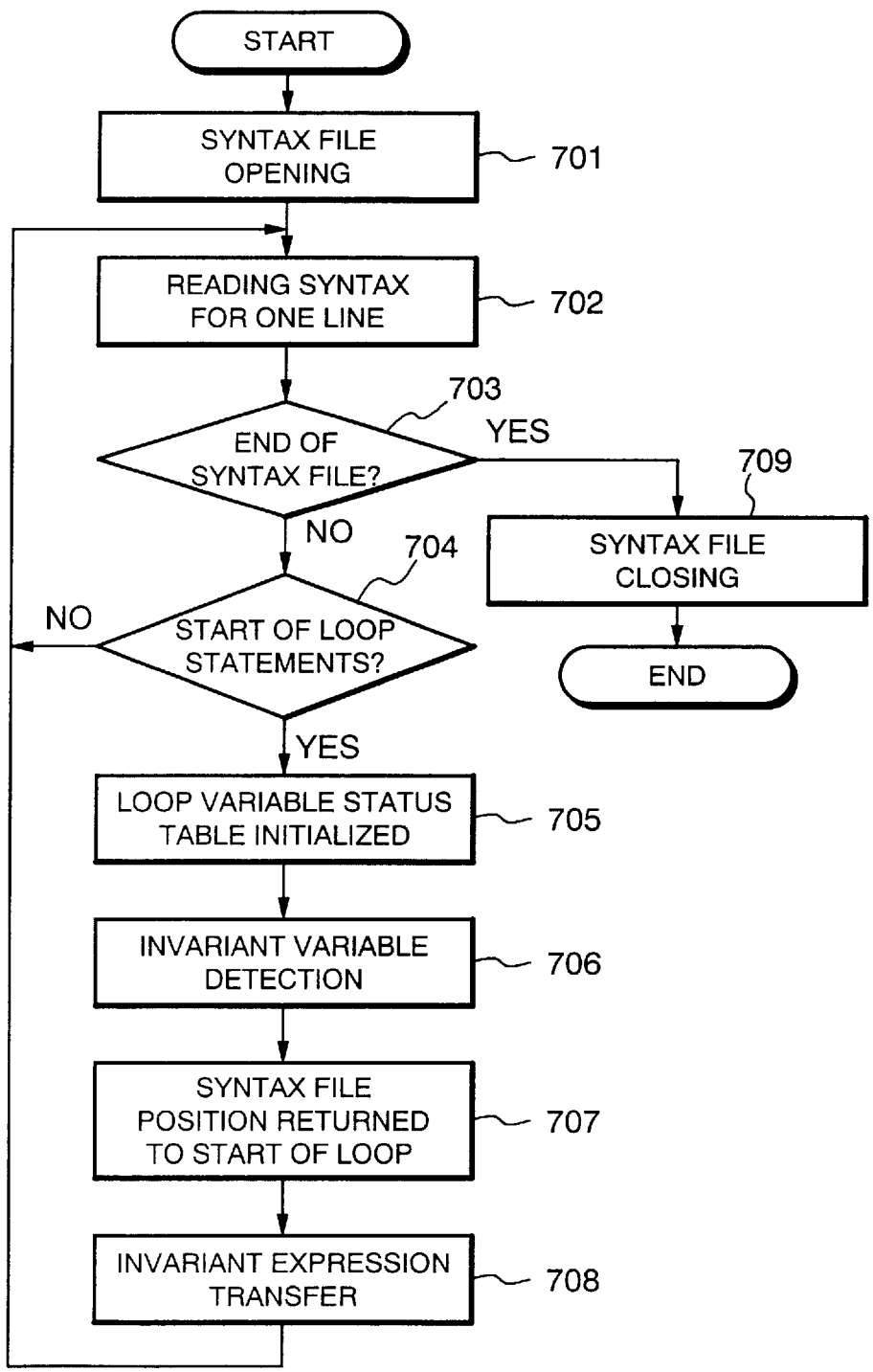
FIG. 7 is a flowchart to show the operation of the reference loop invariant expression transfer section of this embodiment.

FIG. 7 shows the procedure of the processing by the reference loop invariant expression transfer section 60.

Figures 25, 26:
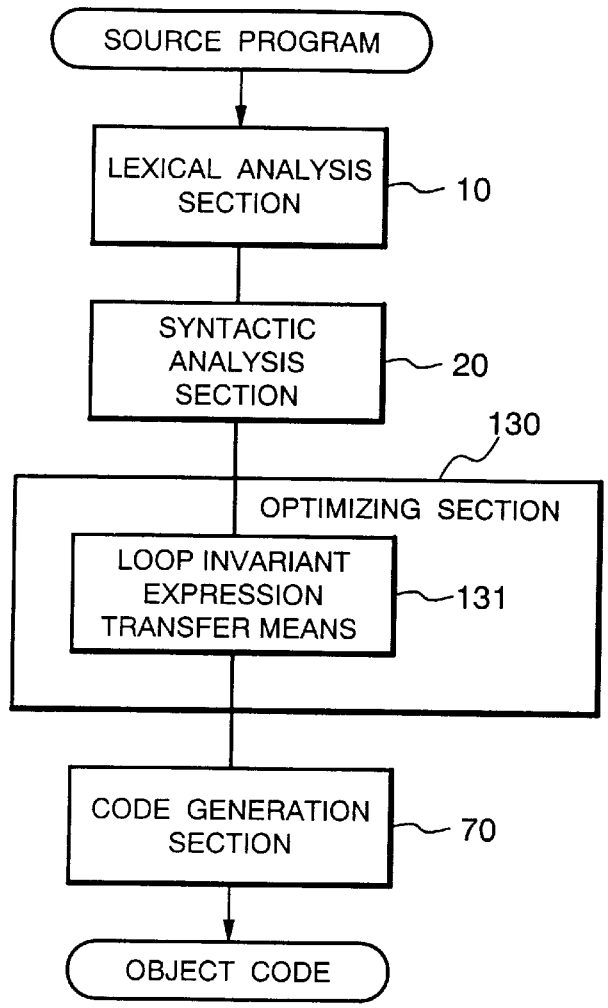
FIG. 25 is a block diagram to show the configuration of a conventional compiler optimizing device.
FIG. 26 is a diagram to show the configuration of a loop variable status table.

Referring to the figure, even when function calls exist in the loop processing syntax as described above, the reference loop invariant expression transfer section 60 recognizes the variables updated by such functions by referring to the update variable control table 300 generated by the update variable extraction section 40 and the update variable review section 50. According to the obtained data, the section extracts the invariant expressions and transfers them out of the loop. Note that a loop variable status table 410 with four columns for variable name 411, reference 412, assignment 413 and change 414 is generated in the processing by the reference loop invariant expression transfer section 60, but its description is omitted since it is the same as the loop variable status table 410 of FIG. 26, which has been explained in the conventional art. The same reference numerals as the conventional one are provided to the elements of the table.

Next, referring to FIG. 7, the procedure of the processing by the reference loop invariant expression transfer section 60 is described below.

Firstly, a certain syntax file is opened (Step 701). Next, a syntax for one line is read (Step 702). Then, it is judged whether the syntax represents the end of syntax file (Step 703). If it is the end of syntax file, the syntax file is closed and the processing is terminated (Step 709). If it is not the end of syntax file, it is judged whether the read syntax is at the beginning of loop statements or not (Step 704). If it is not, the processing returns to Step 702. If it is at beginning of loop statements, all items of the variable name column 411, the reference column 412, the assignment column 413 and the change column 414 on the loop variable status table 410 are initialized with "0" (Step 705).

Next, the variables whose values do not change even after repetition in the loop statements are detected by the invariant variable detection (Step 706). Here, the variables constituting the expressions in the loop are checked to see whether any reference or assignment is made. Necessary data are entered to the variable name column 411, the reference name 412 and the assignment column 413 of the loop variable status table 410. Since a variable subject to assignment after the processing of reference 412 has different values for the first repetition and the repetition from the second time, indication data is also entered to the change column 414.

Figure 28:
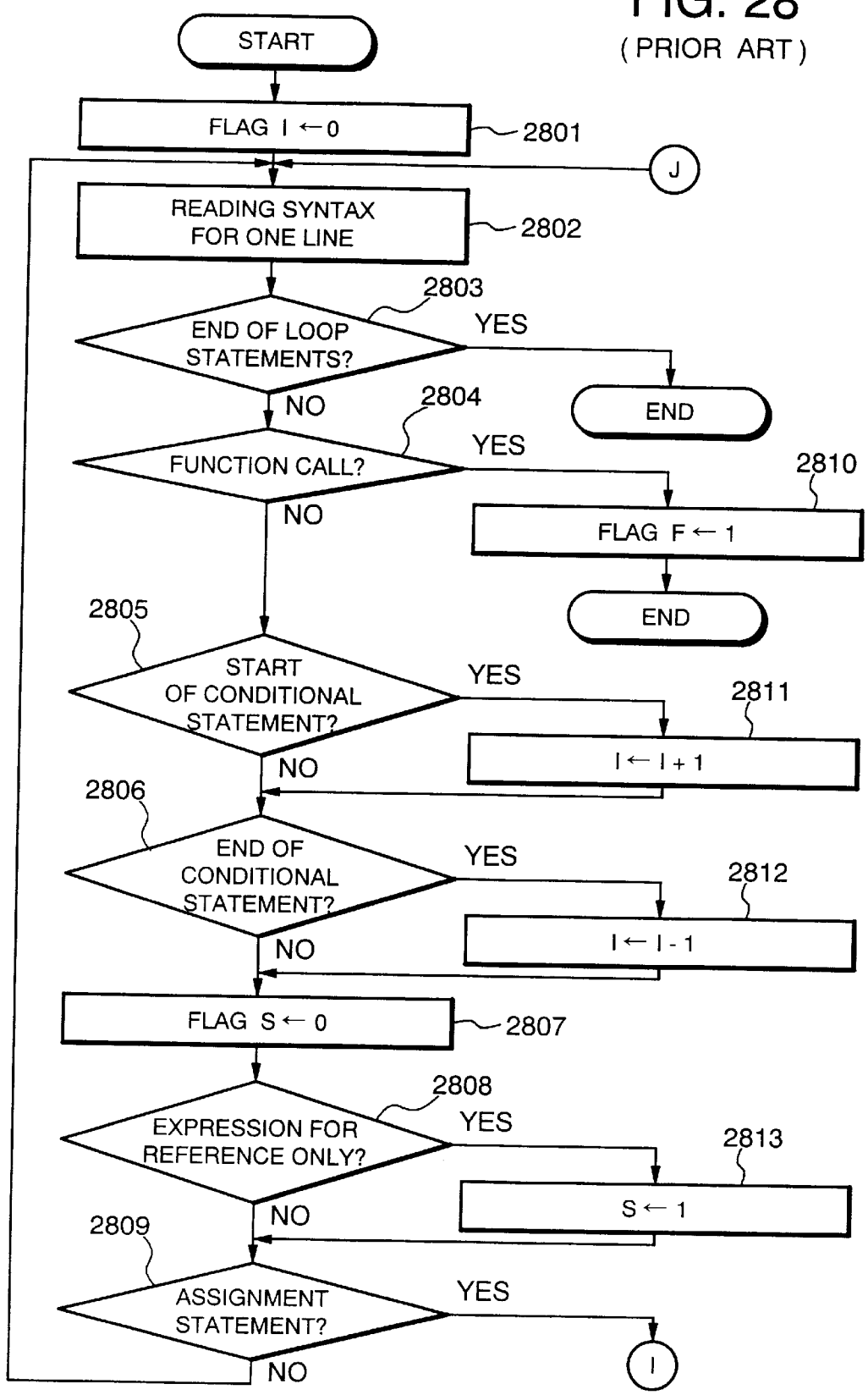
FIG. 28 is a flowchart to show the operation of the loop invariant expression transfer section in a conventional optimizing device to illustrate the operation until assignment statement judgment in the invariant variable detection.
Figure 29:
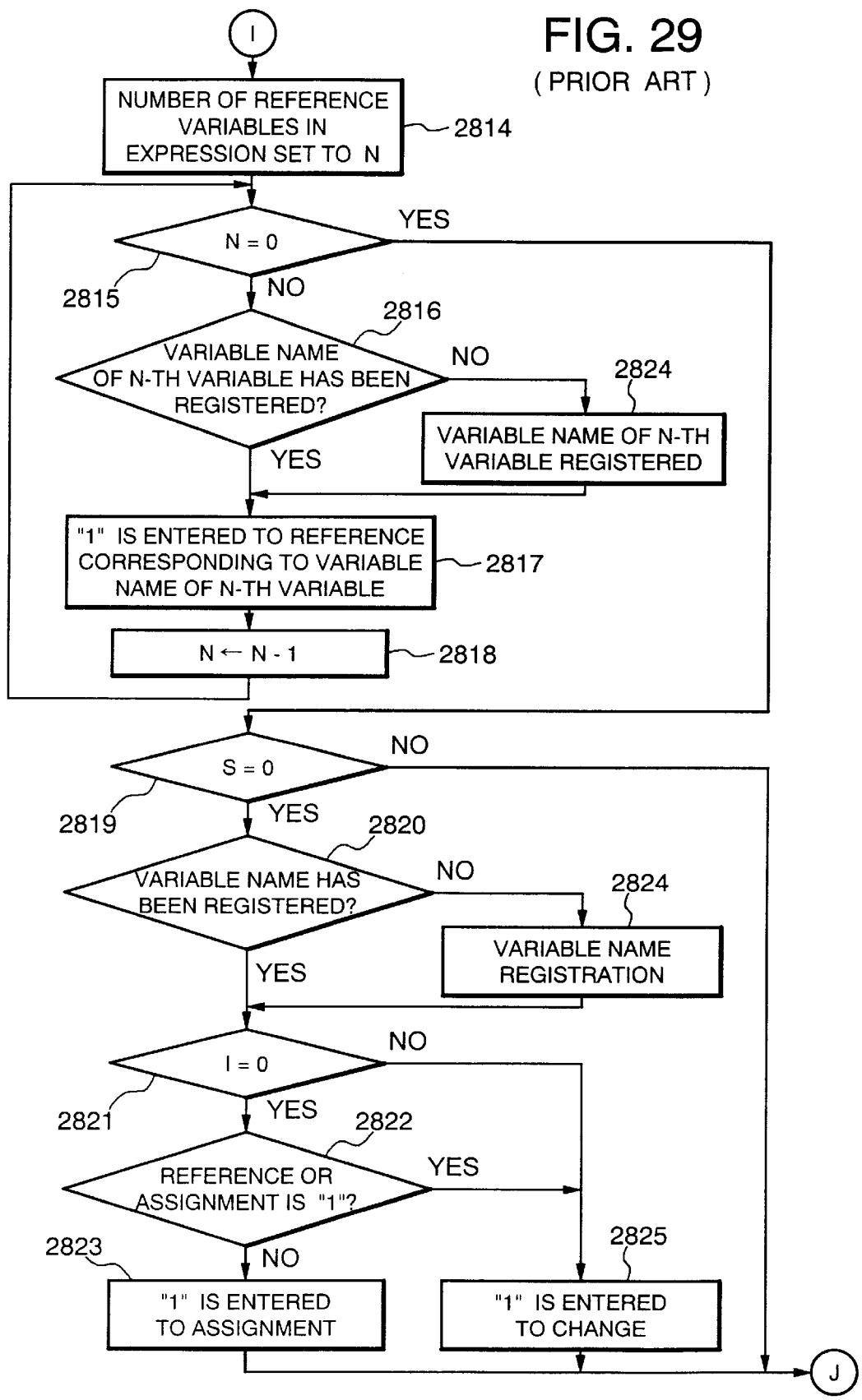
FIG. 29 is a flowchart to show the loop invariant expression transfer section in a conventional optimizing device to illustrate the invariable expression transfer operation.

Referring now to the flowchart of FIGS. 8 and 9, the procedure of the invariant variable detection (Step 706) is described below. Note that the invariant variable detection according to this embodiment makes, when the read syntax is a function call statement (YES at Step 804), reference to the update variable control table 300 and updates the loop variable status table 410 (Step 810). At this point, it is different from the conventional method where the flag F indicating the existence of a function call in the loop statements is set to "1" and the invariant variable detection is terminated (FIG. 28, Step 2810).

Firstly, the indication flag I to indicate that a conditional statement is being processed is initialized with "0" (Step 801). Then a syntax for one line is read (Step 802) and it is judged whether the read syntax is the statement at the end of loop statements (Step 803). If the read statement is the syntax at the end of loop statements, the invariant variable detection is terminated.

If the read statement does not represent the end of loop statements, then it is judged whether the read syntax is a function call statement (Step 804). If the read syntax is not a function call statement, the processing is proceeded to Step 805. If it is a function call statement, the update variable control table 300 is referenced. Among the variables updated by the applicable function, those which have not been registered to the variable name column 411 of the loop variable status table 410 are registered and at the same time "1" is entered to the change column 414 (Step 810). Then the processing goes to Step 805.

Next, it is judged whether the read syntax is at the beginning of conditional statements (Step 805). If it is not at the beginning of conditional statements, processing is proceeded to Step 806. On the other hand, if it is at the beginning of conditional statements, the expressions in the conditional statements may not be executed. In this case, after incrementing the flag I indicating that the conditional statement is being processed by "1" (Step 811), processing is proceeded to Step 806.

Next, it is judged whether the read syntax represents the end of conditional statements (Step 806). If it does not represent the end of conditional statements, then the processing proceeds to Step 807. On the other hand, if it represents the end of conditional statements, the flag I to indicate that the conditional statement is being processed is decremented by "1" before proceeding to Step 807.

Then, a flag S to indicate that the syntax currently being processed is an expression for reference only is initialized with "0" (Step 807) and it is judged whether or not the read syntax is an expression for reference only (Step 808). If the expression is for reference only, it does not contain any variable for assignment. In this case, the reference expression flag S for judgment whether or not processing for assignment expression is required is set to "1" (Step 813). In the procedure from Step 814, data are registered to the loop variable status table 410 and the loop variable status table is arranged to fill in the data of reference, assignment and change for the variables in the expressions.

If the read syntax is not an expression for reference only, it is judged whether the read syntax is an assignment subject statement for a variable (Step 809). If it is not an assignment subject statement for a variable, the processing returns to Step 2802. If it is an assignment subject statement for a variable, the loop variable status table is arranged in the procedure from Step 814.

In the loop variable status table arrangement, the number of variables as the reference subjects in the assignment origin expression is set to a counter N in order to check the number of variables before the invariant variable detection (Step 814). Then, it is judged whether the counter N has "0" (Step 815). If it does not have "0", the N-th variable has not been subjected to the invariant variable detection. It is judged whether the variable name of the N-th variable has been registered to the variable name column 411 on the loop variable status table 410 (Step 816) If the variable name has been registered, the processing is proceeded to Step 817. If not, the variable name of the N-th variable is registered to the variable name column 411 of the loop variable status table 410 (Step 824) and the processing is proceeded to Step 2817. The value "1" is entered to the reference column 412 for the variable name of the N-th variable (Step 817), the value at the counter N is decremented by "1" and the processing returns to Step 815 (Step 818). The above processes are repeated for the remaining variables until the counter N has "0".

If the counter N has "0", it means that there is no variable which has not been subjected to the invariant variable detection, and it is judged whether the reference expression flag S is "0" (Step 819). If the flag S is not "0", the syntax which is currently being processed is an expression for reference only. In this case, the processing returns to Step 802 without making any processing for an assignment statement. If the flag S is "0", it is judged whether the assignment destination variable name is registered to the variable name column 411 of the loop variable status table 410 (Step 820). If it is registered, the processing is proceeded to Step 2821. If it is not, the variable name of the assignment destination variable is registered to the variable name column 411 on the loop variable status table 410 (Step 825) and the processing is proceeded to Step 821.

Next, it is judged whether the conditional statement processing flag I is "0" (Step 821). If it is not "0", the syntax is under processing of the conditional statement. In this case, to prevent transfer of the expression, "1" is entered to the change column 414 for the variable name of the assignment destination variable on the loop variable status table 410 (Step 826) before return to Step 2802. If the conditional statement processing flag I is "0", then it is judged whether "1" is entered to the reference column 412 or the assignment column 413 for the variable name of the assignment destination (Step 822). If the reference column 412 or assignment column 413 has "1", such variable may have different values for the first repetition and the repetitions from the second time. To prevent transfer of the expression including the above variable, "1" is entered to the change column 414 for the variable name of the assignment destination variable (Step 826) before return to Step 802. If the reference 412 or assignment 413 does not have "1", then "1" is entered to the assignment column 413 for the variable name of the assignment destination variable (Step 823) before return to Step 802.

Figure 27:
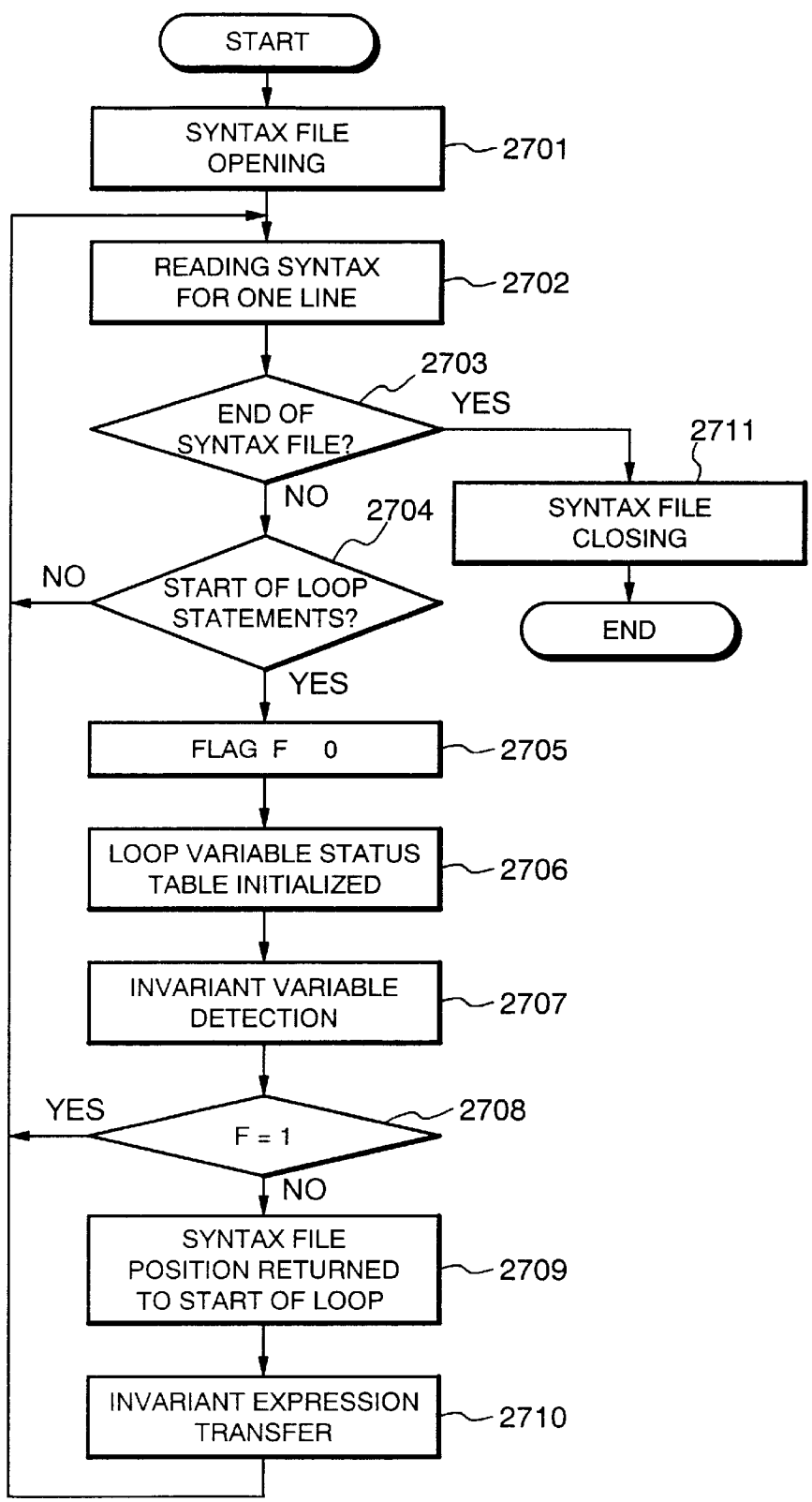
FIG. 27 is a flowchart to show the operation of the loop invariant expression transfer section in a conventional optimization device.

Until arrival at the end of loop statements, the above loop invariant variable detection procedure (Steps 801 to 826) is repeated. After it is repeated until the end of loop statements, the processing returns to FIG. 27 and goes to Step 707.

After detection of invariant variables in Step 706, the reading position for the syntax file is returned to the initial position of the loop (Step 707). Then, in the invariant expression transfer, the loop variable status table 410 is referenced and the invariant expressions consisting of expressions with invariant values including the assignment destination variables of the assignment expressions containing variables whose values may change in repetitions are transferred out of the loop (Step 708).

Figure 10:
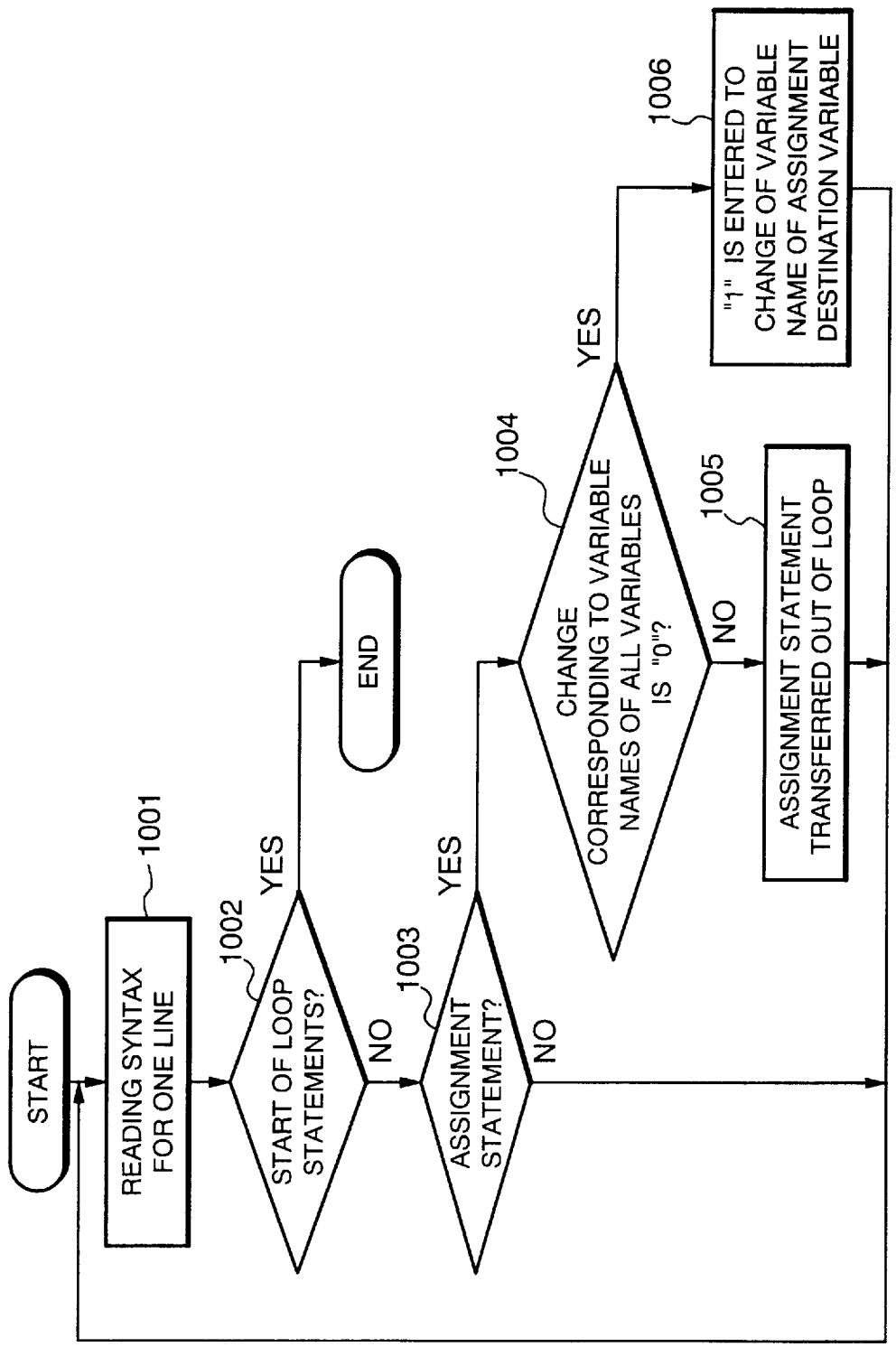
FIG. 10 is a flowchart to show the operation of the reference loop invariable expression transfer section of this embodiment to illustrate the invariant expression transfer operation.
Figure 30:
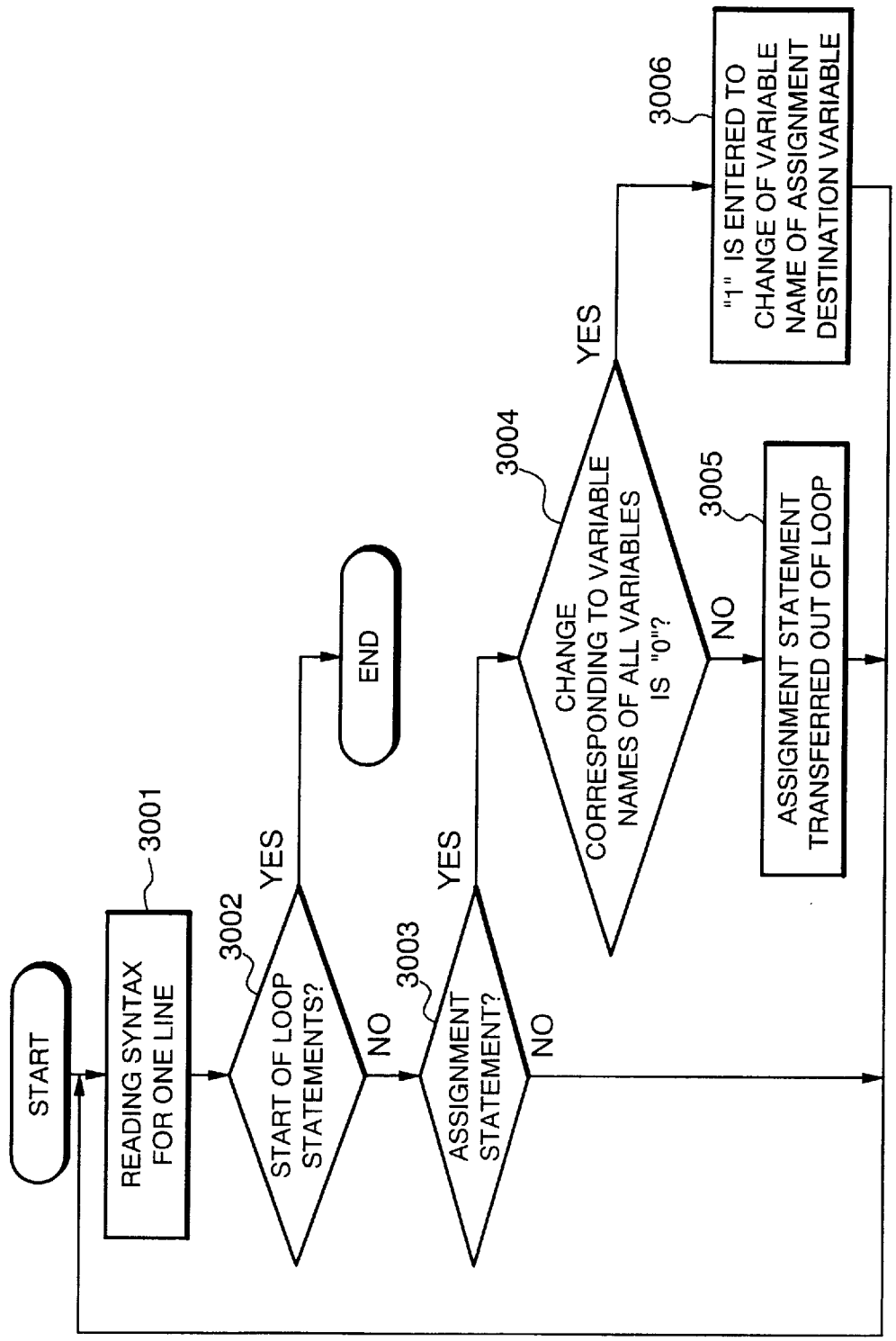
FIG. 30 is a flowchart to show the invariable expression transfer section illustrating the loop invariant expression transfer section in a conventional optimizing device.

Referring now to the flowchart of FIG. 10, the procedure of the invariant expression transfer (Step 708) is described below. Note that the invariant expression transfer in this embodiment is similar to the invariant expression transfer using a conventional optimizing device as shown in FIG. 30.

Firstly, a syntax for one line is read (Step 1001). Then, it is judged whether the read syntax represents the end of loop statements (Step 1002). If it represents the end of loop statements, the invariant expression transfer is terminated. If the read statement does not represent the end of loop statements, then it is judged whether the read syntax represent an assignment statement (Step 1003). If it does not represent an assignment statement, the processing returns to step 1001. On the other hand, if the read statement represents an assignment statement, the change column 414 of the loop variable status table 410 is referred to and it is judged whether the change data is "0" for all variables (Step 1004).

If the change data is "0" for all variables registered to the change column 414 of the loop variable status table 410, the result of this assignment statement does not change in repetition. The syntax of the assignment statement is transferred out of the loop statement before return to Step 1001 (Step 1005).

On the other hand, when there is a variable with a value other than "0", the value of its assignment destination variable is also changed. "1" is entered to the change column 414 corresponding to the variable name of the assignment destination variable before return to Step 1001 (Step 1006).

Until the end of loop statements, the above invariant expression transfer procedure (Steps 1001 to 1006) is repeated to move some invariant expressions. After that, the processing returns to Step 702 in FIG. 7.

Thus, the processing by the reference loop invariant expression transfer section 60 is repeated until arrival at the end of syntax file.

Next, a specific example of operation when a source program 1001 as shown in FIG. 11 is compiled with a compiler optimizing device according to this embodiment is described below.

Figure 4:
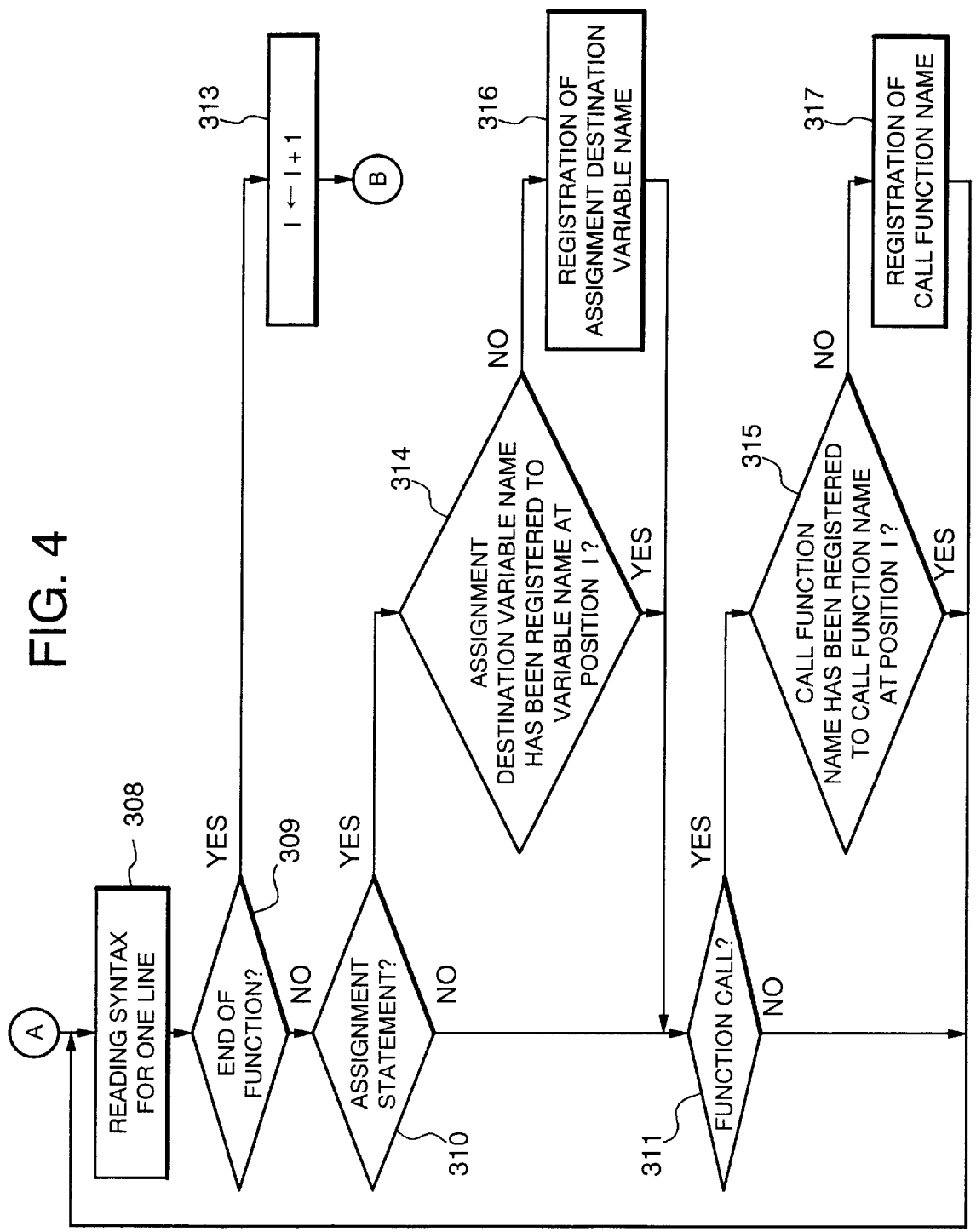
FIG. 4 is a flowchart to show the operation of the update variable extraction section of this embodiment from reading of syntax for one line.

The source program 1001 is subjected to the necessary analysis processing by the lexical analysis section 10 and the syntactic analysis section 20 and proceeded to the processing by the optimizing section 30, the processing by the update variable extraction section 40 is executed (See FIGS. 3 and 4).

At Step 301, a syntax file corresponding to the source program 1101 is opened. At Step 302, all items of a position column 301A, a function name column 302A, a variable name column 303A and a call function name column 304A on an update variable control table 300A are initialized with "0". Then, at Step 303, a variable I to indicate the position of the update variable control table 300 is initialized to "1". Steps 304 to 306 are repeated until the function start statement 1103 is reached.

The function start statement 1103 is judged to be the function start statement at Step 306. The name of this function "main" is registered to the column of the function name 302A corresponding to the first data of the position 301A on the update variable control table. After that, Steps 308 to 311 are repeated until the end statement of function 1117 is reached.

Since assignment statements 1104, 1107, 1110, 1111, 1113 and 1115 are assignment statements, they are judged to be the assignment statements at Step 310 and subjected to the registration judgment at Step 314. The assignment destination variable names for the assignment statements 1104, 1107, 1110, 111 and 1113 are not registered to the column of the variable name 303A corresponding to the first data of the position 301A. At Step 316, assignment destination variable names "i", "a", "b", "e", "h" are registered to the corresponding columns for the variable name 303A. The assignment destination variable name "i" for the assignment statement 1115 has been already registered to the above column of the variable name 303A, and it is not registered.

Since function call statements 1108 and 1109 are function call statements, they are judged to be the function call statements at Step 311 and subjected to the registration judgment at Step 315. The call function names of the function call statements 1108 and 1109 are not registered to the column of the call function name 304A corresponding to the first data of the position 301A. At Step 317, call function names "func1" and "func2" are registered to the applicable column of the call function name 304A.

When the end statement of function 1117 is reached, it is judged to be the end statement of function at Step 309. Then, the position I is incremented by 1 at Step 313 and the processing returns to Step 304, which is for syntax file termination judgment.

After that, the same processing is executed for an function start statement 1118, an assignment statement 1119, a function call statement 1120, a function end statement 1121, a function start statement 1122, an assignment statement 1123, a function end statement 1124, a function start statement 1125, an assignment statement 1126 and a function end statement 1127. Upon completion of processing for the function end statement 1127, a syntax for one line statement is read at Step 304. it is judged to be the end of syntax file at Step 305 and the syntax file is closed at Step 312, which terminates the processing by this series of update variable extraction section 40.

FIG. 13 shows the update variable control table 300A generated by the above procedures.

Figure 6:
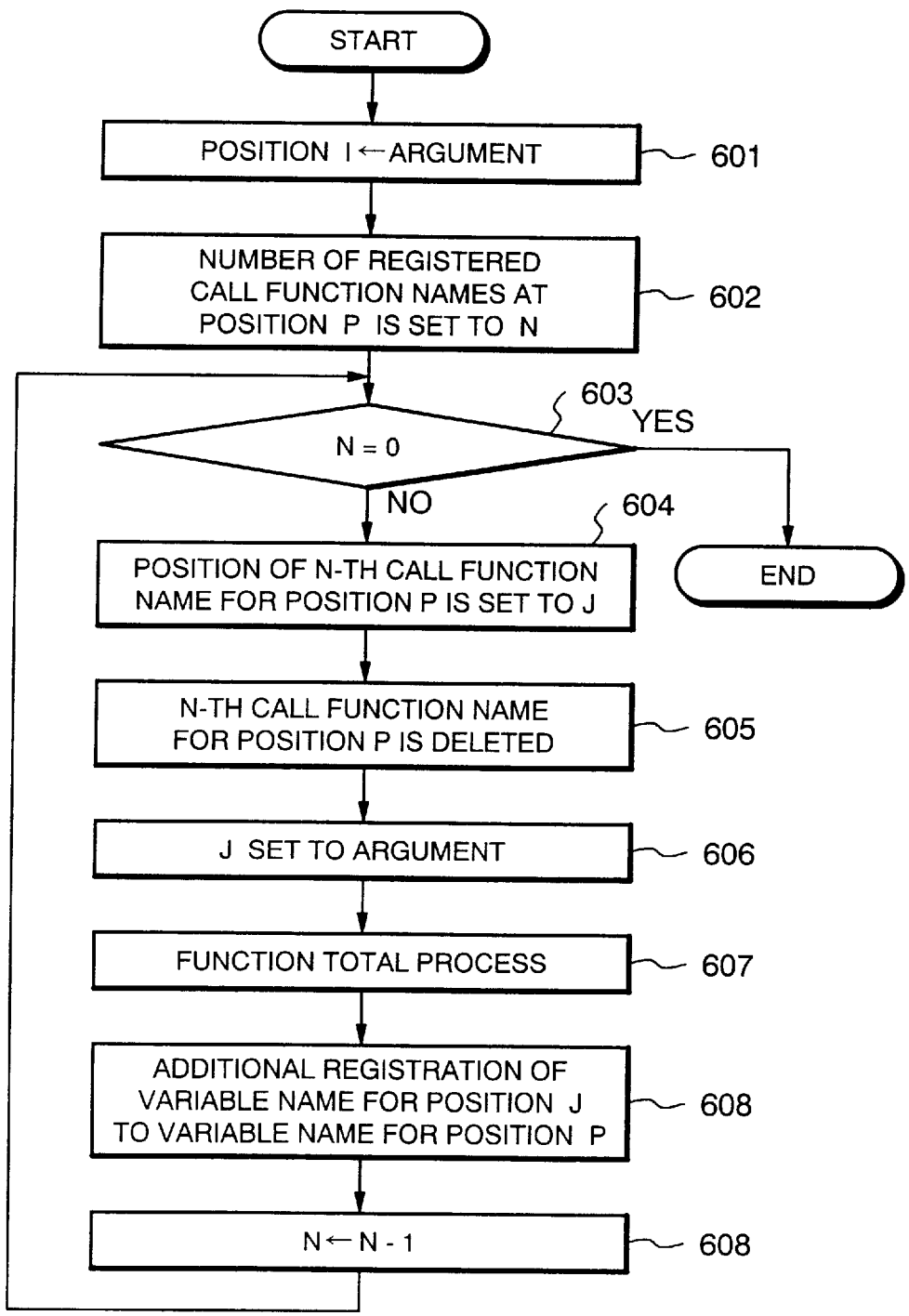
FIG. 6 is a flowchart to show the operation of the update variable review section of this embodiment illustrating the function total processing.

Next, the processing by the update variable review section 50 is executed (see FIGS. 5 and 6).

Firstly, the variable I indicating the position of the update variable control table is set to "1" at Step 501. Then, the procedure at Steps 502 to 505 is repeated until the end of the update variable control table 300A.

In other words, "1" as the initial value of the variable I is set as the argument at first. It calls the subroutine for function total processing at Step 504.

Then, at Step 601, the argument value "1" is set to the variable P indicating the position of the update variable control table 300A. At Step 602, the number of the call functions registered at the position P of the update variable control table 300A is set to N. Since the column of the call function name 304A corresponding to the data P=1 data for the position 301A has two function names "func1" and "func2" registered, "2" is set to the counter N.

Next, judgment is made at Step 603. Since the counter N has a value other than "0", it obtains the N-th call function at the position P and sets the position of the function name to the variable J at Step 604. The set value for N is "2". When referring to the column of the call function name 304A corresponding to P=1 for the position 301A, it is learned that the registered function name for the counter N=2 is "func2". This function name "func2" is registered to the function name 802A corresponding to the third data of the position 301 and "8" is set to the variable J. At Step 605, the function name N=2, which is "func2" registered at the column of the call function name 304A corresponding to P=1 for the position 301A is deleted.

At Step 606, the value of the variable J, which is "3" is set as the argument. At Step 607, the subroutine for function total is recursively called. For the function total subroutine, the argument value "3" is set to the variable P at Step 601. Next, at Step 602, "0" is set to the counter N since no function name has been registered yet to the column of the call function name 304A corresponding to P=3 for the position 301A. Then, in the judgment at Step 603, the counter N is found to have "0" and the function total subroutine is terminated. P, N and J are returned to the values before the call of the function total subroutine "1", "2" and "3".

At Step 608, the variable name "h" registered to the column of the variable name 303A corresponding to the data J=3 for the position 301A is additionally registered to the column of the variable name 303A corresponding to the data P=1 data for the position 301A. Note that the variable name "h" has been already registered and it is not necessary to do anything in this embodiment.

At Step 609 with the counter N having "2", and the judgment processing is made at Step 603 with the counter N set to "1 (=2–1)". Since the counter N has a value other than "0", the processing of Step 604 is executed. When referring to the column of the call function name 304A corresponding to the data P=1 for the position 301A, the registered function name for the counter N=1 is "func1". This "func1" has been registered to the column of the function name 302A corresponding to the second data for the position 301A and "2" is set to the variable J. At Step 605, the function name N=1, which is "func1" registered to the column of the call function name 304A corresponding to the data P=1 for the position 301A is deleted.

Next, at Step 606, the value of the variable J, which is "2" is set as the argument. At Step 607, the subroutine for function total is recursively called. For the function total subroutine, the argument value "2" is set to the variable P at Step 601. Next, at Step 602, "1" is set to the counter N since a function name "func3" has been registered to the column of the call function name 304A corresponding to the data P=2 for the position 301A. Then, in the judgment at Step 603, the counter N is found to have a value other than "0" and the processing of Step 604 is executed. The function name N=1 registered to the column of the call function name 304A corresponding to the data P=2 for the position 301A is "func3". This function name "func3" has been registered to the column of the function name 302A corresponding to the data P=4 for the position 301A and "4" is set to the variable J. At Step 605, the function name "func3" for N=1 registered to the column of the call function name 304A corresponding to the data P=2 for the position 301A is deleted.

Next, at Step 606, the value of the variable J, which is "4" is set as the argument. At Step 607, the subroutine for function total is recursively called.

For the function total subroutine, the argument value "4" is set to the variable P at Step 601. Next, at Step 602, "0" is set to the counter N since no function name has been registered yet to the column of the call function name 304A corresponding to the data P=4 for the position 301A. Then, in the judgment at Step 603, the counter N is found to have "0" and the function total subroutine is terminated. P, N and J are returned to the values before the call of the function total subroutine "2", "1" and "4".

At Step 608, the variable name "f" registered to the column of the variable name 303A corresponding to the data J=4 for the position 301A is additionally registered to the column of the variable name 303A corresponding to the data P=2 for the position 301A.

At Step 609 with the counter N having "1", the counter N set to "0 (=1–1)" and the processing returns to the judgment at Step 603. Since the counter N has "0", the function total subroutine is terminated. P, N and J are returned to the values before the call of the function total subroutine "1", "1" and "2".

At Step 608, the variable names "g" and "f" registered to the column of the variable name 303A corresponding to J=2 data for the position 301A is additionally registered to the column of the variable name 303A corresponding to the P=1 data for the position 301A. At Step 609, the counter N is found to have "1" and the counter N is set to "0 (=1–1)" and the processing returns to the judgment at Step 603. Since the counter N has "0", the function total subroutine is terminated.

Then, returning to FIG. 5, the variable I is "1". The position I is changed to "2(=1+1)" and the processing returns to the judgment at Step 502.

Similarly, the positions "2", "3" and "4" are set for the argument at Step 503 to repeat the call processing step 504 by the function total processing section so that the processing by the update variable review section 50 is terminated.

FIG. 14 shows an update variable control table 300B corrected in the above procedure.

Next, the processing of the reference loop invariant expression transfer section 60 is executed (See FIGS. 7 to 10).

Firstly, at Step 701, a syntax file corresponding to the source file 1101 is opened. Then, until the loop start statement 1106 is reached, the processing from Step 702 to Step 704 is repeated.

Figure 8:
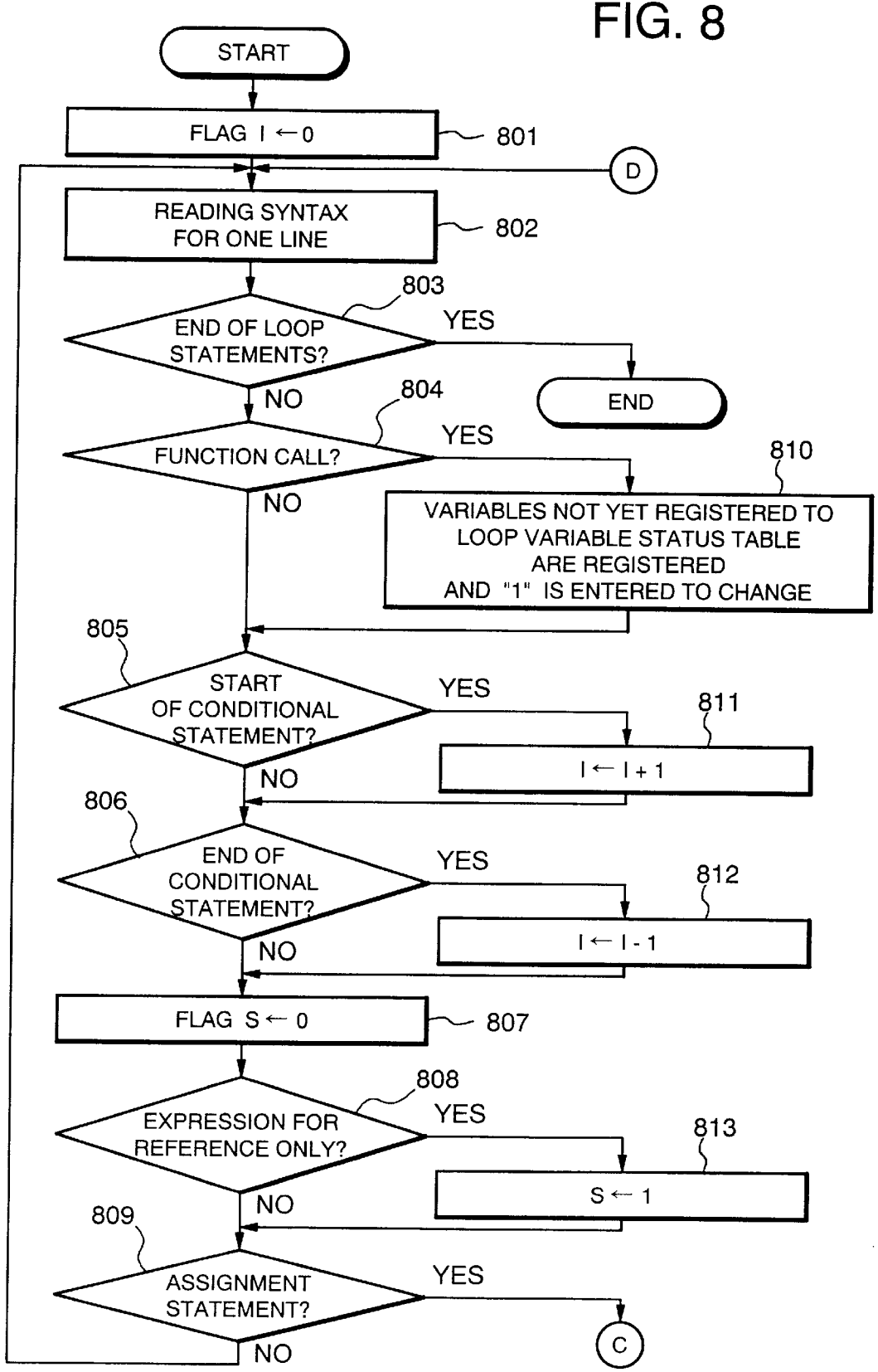
FIG. 8 is a flowchart to show the operation of the reference loop invariant expression transfer section of this embodiment to illustrate the operation until assignment statement judgment in the invariant variable detection.
Figure 9:
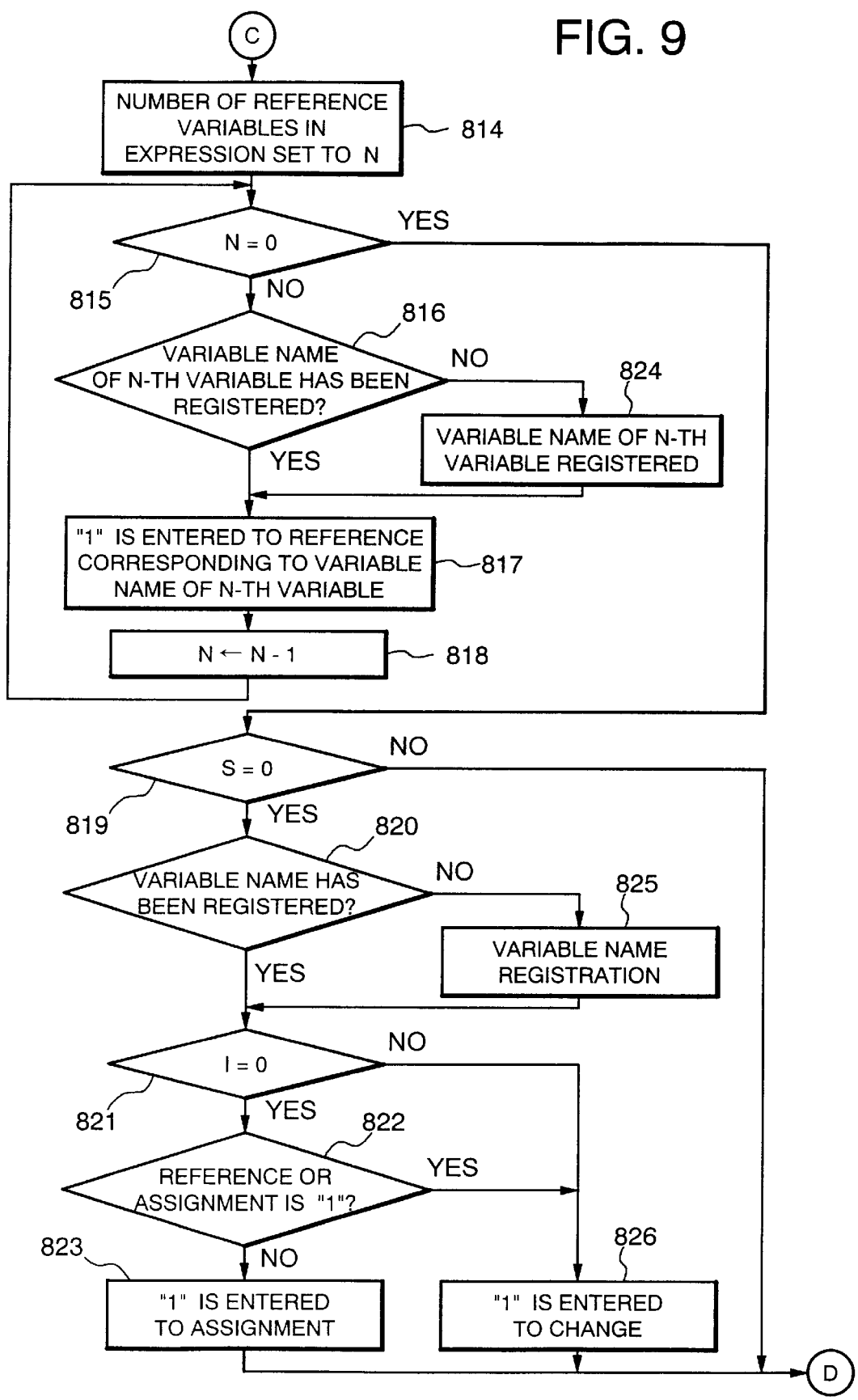
FIG. 9 is a flowchart to show the operation of the reference loop invariant expression transfer section of this embodiment to illustrate the operation from setting of the reference variable number in the invariant variable detection.

Next, at Step 705, all items of the variable name column 411A, the reference column 412A, the assignment column 413A, the change column 414A on the loop variable status table are initialized with "0" and the invariant variable detection of Step 706 is executed (See FIGS. 8 and 9).

In the invariant variable detection, the flag I indicating that a conditional expression is being processed is firstly initialized with "0" at Step 801. Then, the processing from Step 802 to Step 809 is repeated until an loop end statement 1116 is reached.

The assignment statement 1107 is judged to be an assignment statement at Step 809 and subjected to the processing of Step 814. Since the assignment statement 1107 is an assignment statement with constant and does not have any variable to be referenced, "0" is set to the counter "N". Then, the judgment of Step 815 is executed. The counter N has "0" and the judgment of Step 819 is executed. The reference expression flag S is "0" and the judgment of Step 820 is executed. Since the assignment destination variable name "a" for the assignment statement 1107 is not registered to the variable name column 411A, the assignment destination variable name "a" is registered to the variable name column 411A at Step 825.

Next, the judgment of Step 821 is executed. Since the flag I is "0", the judgment of Step 822 is executed. "1" is not entered to the reference column 412A and assignment column 413A corresponding to the variable name "a" at the variable name column 411A and at Step 823, "1" is entered to the assignment 413A corresponding to the variable name "a" at the variable name column 411A.

The function call statement 1108 is judged to be a function call statement at Step 804. At Step 810, the update variable control table 300B is referred to according to the function name "func1" of the function call statement 1108 so that the variable names "g" and "f" of the variable name 303A corresponding to "func1" of the function name 302A are additionally registered to the variable name 411A on the loop variable status table 410A and at the same time, "1" is entered to the change column 414A for each of "g" and "f".

The processing similar to that for the function call statement 1108 is executed for the function call statement 1109. The variable "h" is registered to the variable name column 411A on the loop variable status table 410A and at the same time, "1" is entered to the change column 414A for "h".

The assignment statement 1110 is judged to be an assignment statement at Step 809 and the processing of Step 814 is executed. Since the assignment statement 1110 has two variables to be referred to ("c" and "d"), "2" is set at the counter N.

Next, the judgment of Step 815 is executed and the counter N is found to have a value other than "0". Then, the judgment of Step 816 is executed. Since the variable name "d" for the counter N=2 corresponding to the variable referred to at the variable name column 411A, the variable name "d" is additionally registered to the variable name column 411A at Step 824. Then, at Step 817, "1" is entered to the reference 412A corresponding to the variable name "d" at the variable name column 411A.

Then, at Step 818, since the counter N has "2", this counter N is changed to "1 (2−1)" and the processing returns to the judgment of Step 825. Since the counter N does not have "0", the judgment of Step 816 is executed. Since the variable name "c" corresponding to the counter N=1 for the variables to be referred to is not registered to the variable name column 411A, the variable name "c" is additionally registered to the variable name 411A at Step 824. At Step 817, "1" is entered to the reference 412A corresponding to the variable name "c" for the variable name column 411A.

Next, at Step 818, the counter N is found to have "1". This counter N is changed to "0 (1−1)" and the processing returns to Step 815. Since the counter N now has "0", the judgment of Step 820 is executed. Since the assignment destination variable name "b" is not registered to the variable name 411A, Step 825 is executed to additionally register the assignment destination variable name "b" to the variable name 411A.

Next, the judgment of Step 821 is executed. The flag I is "0" and the judgment of Step 822 is executed. Since the reference 412A or the assignment 413A corresponding to the variable name "b" at the variable name 411A does not have "1", at Step 823, "1" is entered to the assignment 413A corresponding to the variable name "b" for the variable name 411A.

For the assignment statement 1111, the similar processing as that for the assignment statement 1110 is executed. "1" is entered to the reference 412 A for each of the variable names "a" and "f" on the loop variable status table 410A. Further, "e" is additionally registered to the variable name 411A and "1" is entered to the corresponding assignment 413A.

A conditional judgment statement 1112 is judged to be a conditional statement in the judgment of Step 805. At Step 811, the variable I is set to "1". Further, the conditional statement 1112 contains the expression for reference only and, in the judgment of Step 808, it is judged to be an expression for reference only and the reference expression flag S is set to "1" at Step 813. At Step 814, since the variable referred to is "g" only in the conditional statement 1112, the counter N is set to "1". Then, the judgment of Step 815 is executed and the counter N is found to have "1". The judgment of Step 816 is executed. Since the variable name "g" is registered to the variable name 411A, "1" is entered to the reference 412A corresponding to the variable name "g" at the variable name 411A. At Step 818, the counter N found to have "1" is changed to have "0 (1−1)" and the processing returns to the judgment of Step 815. Since the counter N has "0", the processing proceeds to the judgment of Step 819. The reference expression flag S is "1" and the processing returns to Step 802.

For the assignment statement 113, the same processing as that for the assignment statement 1110 is executed, but the flag I is "1" at Step 821 and "1" is entered to the change 414A corresponding to the variable name "h" at the variable name 411A.

Upon a conditional expression end statement 1114, the end judgment step 806 judges that the conditional expression ends and the variable I is set to "0" at Step 812.

For the assignment statement 1115, the same processing as that for the assignment statement 1110 is executed, but "1" is already entered to the reference 412A corresponding to the variable name "i" at the variable name 411a in the judgment of Step 822, "1" is entered to the change 414A corresponding to the variable name "i" at the variable name 411A.

When the loop end statement 1116 is reached, it is judged that it is the end of loop statements at Step 803. The invariant variable detection is terminated and the processing returns to FIG. 7.

Then, at Step 707 to return the syntax file position to the start of the loop, the syntax file reading position is returned to the start statement 1108 of the loop statements. Then, the invariant expression transfer processing of Step 708 is executed (See FIG. 10).

In the invariant expression transfer, the processing from Step 1001 to Step 1003 is repeated until arrival at the loot end statement 1116.

The assignment statement 1107 is judged to be an assignment statement at Step 1003, and subjected to the judgment of Step 1004. Since the variable name "a" of the assignment statement 1107 does not have "1" at the column of the change 414A corresponding to the variable name "a" at the variable name 411A, the assignment statement 1107 is transferred out of the loop at Step 1005.

The assignment statement 1110 is judged to be an assignment statement at Step 1003 and subjected to the judgment of Step 1004. Since the variable names "b", "c" and "d" of the assignment statement 1110 do not have "1" at any of the columns under the variable name 411A corresponding to each of "b", "c" and "d" of the variable name 411A, the assignment statement 1110 is transferred out of the lop at Step 1005.

The assignment statement 1111 is judged to be an assignment statement at Step 1003 and subjected to the judgment of Step 1004. Among the variable names "e", "a" and "f" of the assignment statement 1111, "f" of a variable name 412A has "1" at the corresponding column of the change 414A. At Step 1006, "1" is entered to the column 1040 pointed by the change 414A corresponding to the variable name "e" at the variable name 411A for the assignment destination variable name "e".

The assignment statement 1113 is judged to be an assignment statement at Step 1003 and subjected to the judgment of Step 1004. Since the variable name "h" of this assignment statement 1113 has "1" entered at the change 414A corresponding to "h" at the variable name 411A, "1" is entered to the column 1089 pointed by the change 414A corresponding to the variable name "h" at the variable name 411*a* for the assignment destination variation name "h" at Step 1006.

The assignment statement 1115 is judged to be an assignment statement at Step 1003 and subjected to the judgment of Step 1004. Since the variable name "i" of this assignment statement 1115 has "1" entered at the change 414A corresponding to "i" at the variable name 411A, "1" is entered to the column 1041 pointed by the change 414A corresponding to the variable name "i" at the variable name 411*a* for the assignment destination variation name "i" at Step 1006.

When the loop end statement 1116 is reached, the end judgment step 1001 judges that it is the end of loop statements, terminates the invariant expression transfer procedure and returns to FIG. 7.

FIG. 15 shows the loop variable status table generated by the above procedures.

Next, the processing returns to the end judgment of a syntax file at Step 703. When the end of syntax file is reached, the syntax file is closed at Step 709 and this terminates the processing by the reference loop invariant expression transfer section 60.

FIG. 12 shows a loop block 1142 obtained as a result of optimization of the loop block 1105 in the source program 1101. Referring to the figure, the assignment statements 1107 and 1110 in the loop block 1105 including function call statements are transferred out of the loop in this embodiment, which could not be executed in the conventional art.

The loop block 1601 as the result of loop invariant expression transfer as shown in FIG. 31, which is generated by a conventional compiler, and the loop block 1142 as the result of loop invariant expression transfer as shown in FIG. 12 are now compared. The loop block 1601 according to the conventional art contains function calls and the loop invariant expressions are not transferred at all, and the total number of executed statements becomes 181. In contrast, the loop block 1142 according to this embodiment recognizes the changing variables in the call functions and executes transfer of invariant expression transfer, and the total number of executed statements becomes 153, which results in a code generation speed 1.18 times faster than the conventional speed.

Next, a compiler optimizing device according to another embodiment of the present invention is described below.

A compiler optimizing device of this embodiment is constituted in the same way as the device according to the first embodiment as shown in FIG. 1. Specifically, it comprises a lexical analysis section 10 which decomposes the source program into lexical units, a syntactic analysis section 20 which, upon receipt of the lexical analysis result, makes syntactic analysis, an optimizing section 30 which optimizes the code by transferring the loop invariant expressions, and a code generation section 70 which, upon receipt of the optimization result, generates the object code. The optimizing section 30 is further provided with an update variable extraction section 40, an update variable review section 50, a reference loop invariant expression transfer section 60 and an update variable control table 300.

The optimizing device of this embodiment is different from the device of the first embodiment in its processing with the update variable extraction section 40 and its invariant variable detection with the reference loop invariant expression transfer section 60. In other words, it supposes a processing system which can define asynchronous interrupt functions and adds the processing for such interrupt functions. This processing is described below.

FIG. 16 shows the configuration of an update variable control table 310. As shown in the figure, the update variable control table 310 has five columns related each other for registration: a position column 311 to show the position of the update variable control table 310, a function name column 312 to show the name of the function which investigates the names of the update subject variables and the called functions (call functions), a variable name column 313 to show the names of all variables to be updated among the functions belonging to the function name column 312, a call function name column 314 to show all function names when there is a call for any function among those belonging to the function name column 312, and an interrupt column 315 to indicate the interrupt when any function belonging to the function name column 12 is an interrupt function. Among these columns of the update variable table 310, the four columns for position 311, function name 312, variable name 313 and call function name 314 are the same as those in the columns for position 301, function name 302, variable name 303 and call function name 304 of the first embodiment as shown in FIG. 2.

Figure 17:
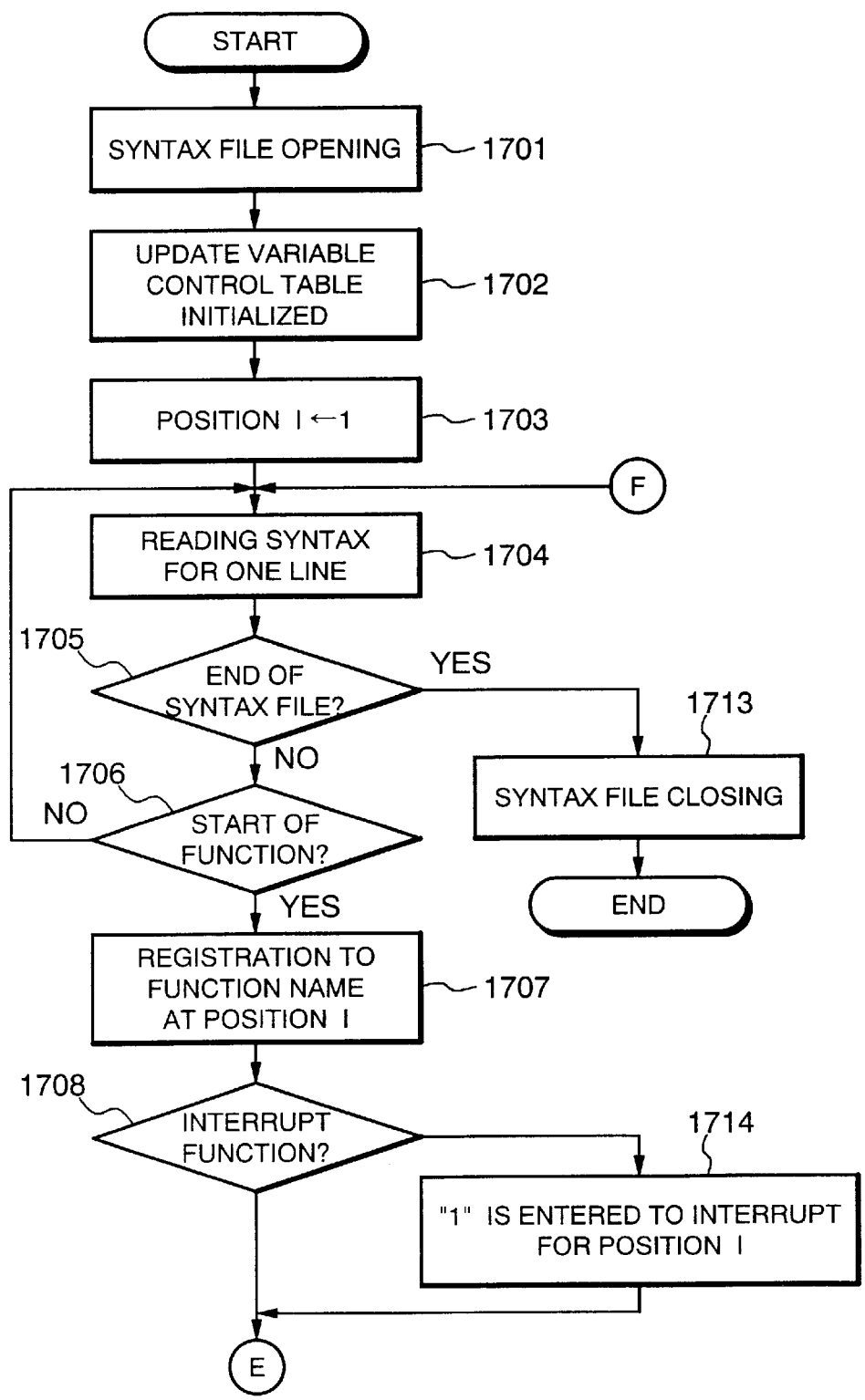
FIG. 17 is a flowchart to show the operation of the update variable extraction section of this embodiment until registration of the function names to the update variable control table.
Figure 18:
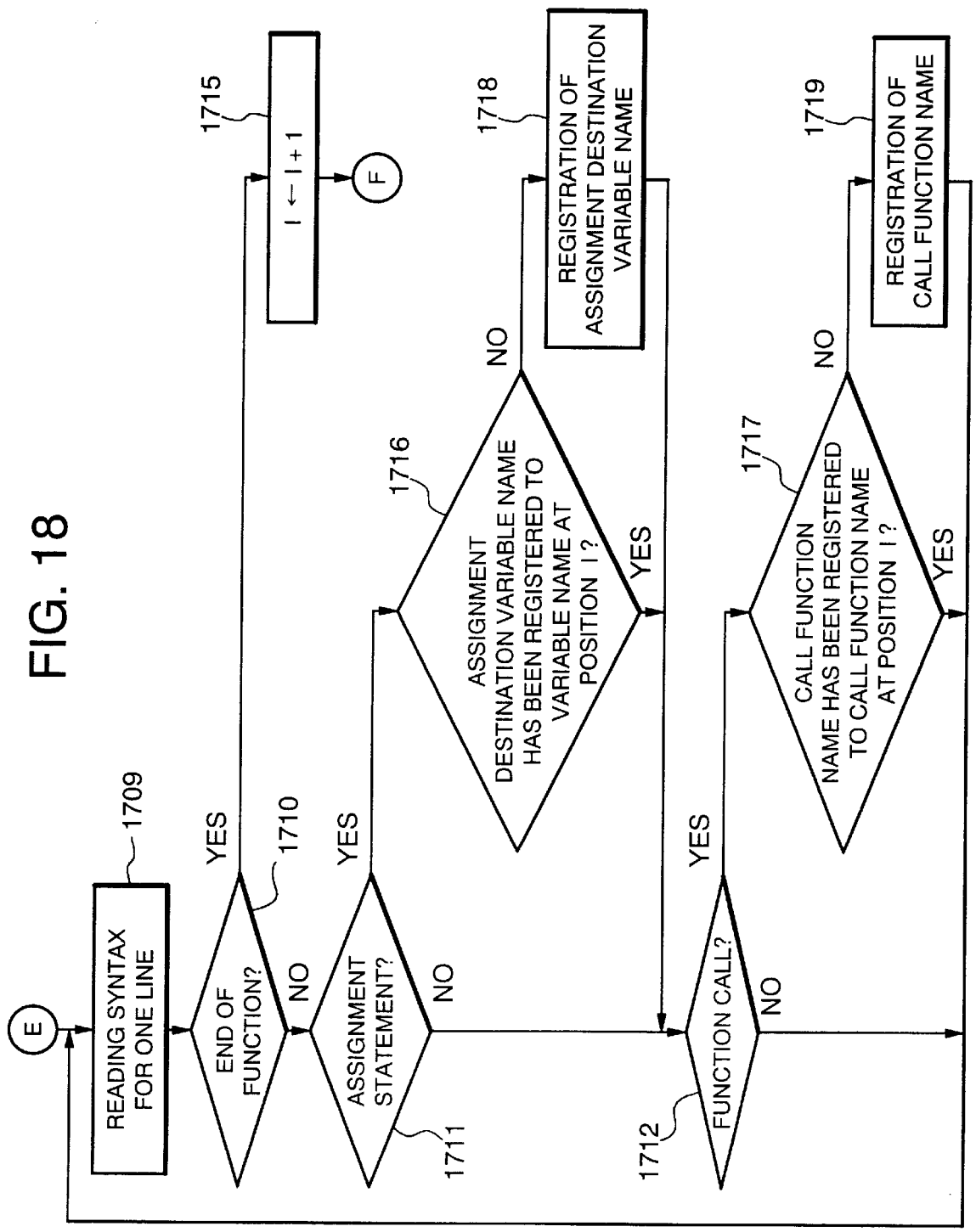
FIG. 18 is a flowchart to show the operation of the update variable extraction section of this embodiment from reading of syntax for one line.

FIGS. 17 and 18 show the procedure of the processing by the update variable extraction section 40 according to this embodiment. Referring to the figures, the operation from Step 1701 to Step 1707 is the same as that from Step 301 to Step 307 in the first embodiment as shown in FIG. 3. At Step 1707, after registering the function name of the applicable function to the function name column 302 corresponding to the first data of the position column 301 on the update variable control table 300, it is judged whether the applicable function is an interrupt function or not (Step 1708). If the applicable function is not an interrupt function, the processing proceeds to Step 1710. If the applicable function is an interrupt function, "1" is entered to the interrupt column 315 corresponding to the data I for the position column 301 on the update control table 300 (Step 1709) and then the processing proceeds to Step 1710. The operation from Step 1710 to Step 1719 is the same as that from Step 308 to Step 317 of the first embodiment as shown in FIG. 4.

Figure 19:
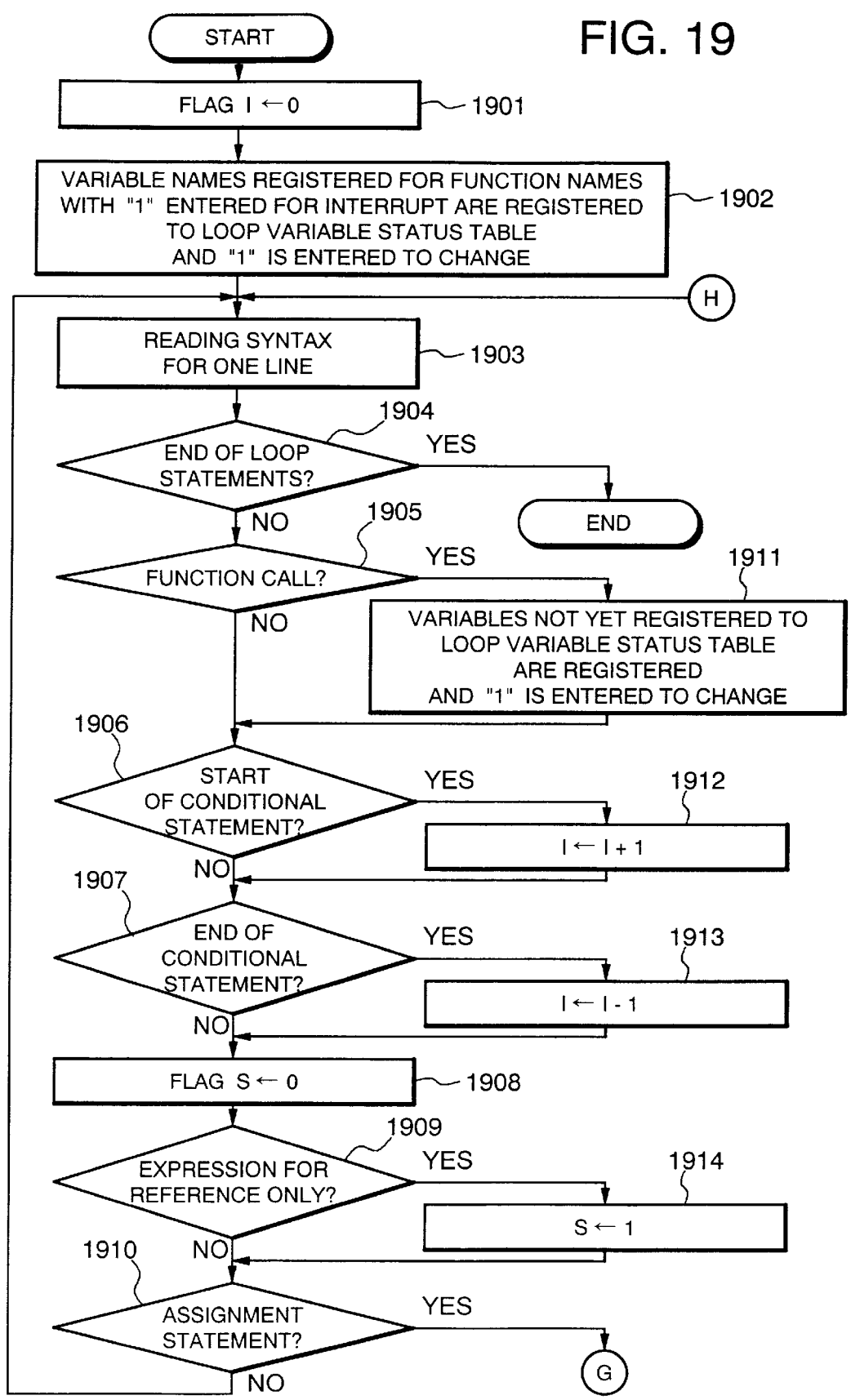
FIG. 19 is a flowchart to show the operation of the reference loop invariant expression transfer section of this embodiment to illustrate the operation until assignment statement judgment in the invariant variable detection.
Figure 20:
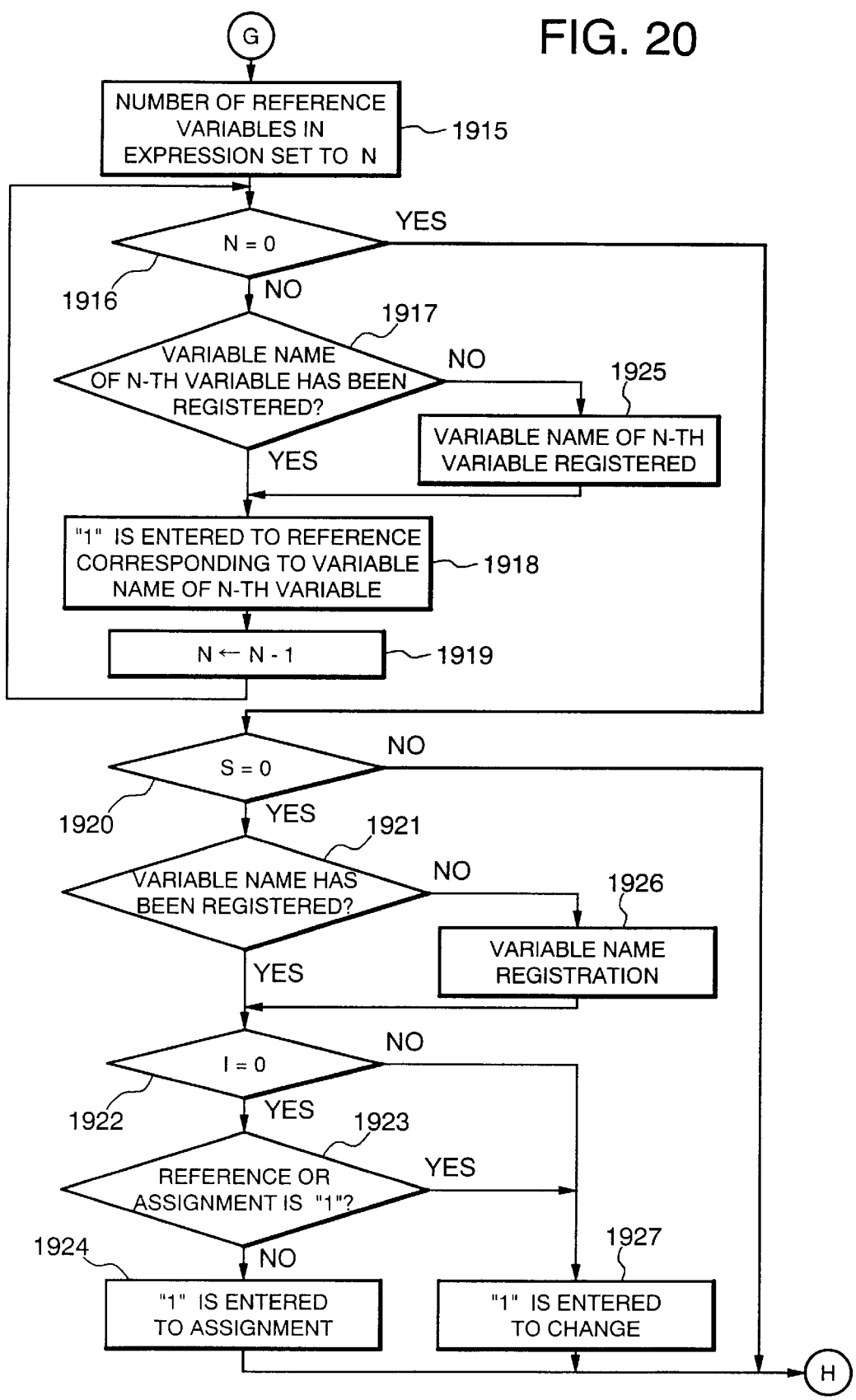
FIG. 20 is a flowchart to show the operation of the reference loop invariant expression transfer section of this embodiment to illustrate the operation from setting of the reference variable number in the invariant variable detection.

FIGS. 19 and 20 show the procedure of the invariant variable detection by the reference loop invariant expression transfer section 60 according to this embodiment. Referring to the figure, the recognition flag I to show that the conditional statement is being processed is firstly initialized with "0" (Step 1901). Then, the variable names registered to the function names with "1" entered at the interrupt column 315 on the update variable control table 310 are additionally registered to the variable column 411 of the loop variable status table 410 and "1" is entered to the change column 414 (Step 1902). The next operation starting from Step 1903 where a syntax for one line is read is the same as that from Step 802 according to the first embodiment as shown in FIGS. 8 and 9.

Next, a specific example of operation when a source program 1201 as shown in FIG. 21 is compiled with a compiler optimizing device according to this embodiment is described below.

The source program 1001 is subjected to the necessary analysis processing by the lexical analysis section 10 and the syntactic analysis section 20 and proceeded to the processing by the optimizing section 30, the processing by the update variable extraction section 40 is executed (See FIGS. 17 and 18).

At Step 1701, a syntax file corresponding to the source program 1201 is opened. At Step 1702, all of a position column 301A, a function name column 302A, a variable name column 303A and a call function name column 304A on an update variable control table 310A as shown in FIG. 16 are initialized with "0". At Step 1703, a variable I to indicate the position of the update variable control table 310A is initialized with "1". Steps 1704 to 1706 are repeated until the function start statement 1203 is reached.

The function start statement 1203 is judged to be the function start statement at Step 1706. The name of this function "main" is registered to the column of the function name 312A corresponding to the first data of the position 301A on the update variable control table at Step 1707.

Then, it is judged whether it is an interrupt function in the judgment at Step 1707. Since the function "main" is not an interrupt function, the processing proceeds to Step 1709 and a syntax for one line is read. After this, until a function end statement 1215 is reached, the processing from Step 1709 to Step 1712 is repeated.

Assignment statements 1204, 1207, 1208, 1209, 1211 and 1213 are assignment statements. They are judged to be assignment statements at Step 1711 and subjected to the registration judgment at Step 1716. Since the assignment destination variable names of the assignment statements 1204, 1207, 1208, 1209 and 1211 are not registered to the column of the variable name 313A corresponding to the first data of the position 311A, assignment destination variable names "i", "a", "b", "e", "h" are registered to the corresponding columns of the variable name 313A at Step 316. The assignment destination variable name "i" of the assignment statement 1213 has been already registered to the variable name 313A corresponding to the first data of the position 311A and is not registered here.

When the function end statement 1215 is reached, it is judged to be the function end statement at Step 1710 and, the position I is incremented by 1 at Step 1715. Then, the processing returns to Step 1704 and a syntax is read for one line.

When, it is judged that it is not the end of syntax file in the judgment of Step 1705, the processing goes to the judgment of Step 1706. Since an interrupt function start statement 1216 is a function start statement, the function name of the interrupt function start statement 1218 "func" is registered to the function name 312A corresponding to the second data for the position 311A at Step 1707.

In the next judgment at Step 1708, since "func" function is a function with an additional keyword "interrupt" which means the interrupt function, it is judged to be an interrupt function. Then, in the processing of Step 1714, "1" is entered to the interrupt 315A corresponding to the second data for the position 311A.

Thereafter, the similar processing is executed for an assignment statement 1217 and a function end statement 1218. Upon completion of processing for the function end statement 1218, a syntax for one line is read at Step 1704, it is judged to be the end of syntax file at Step 1705 and the syntax file is closed at Step 1713, which terminates the processing steps by the update variable extraction means. FIG. 16 shows an update variable control table 310A generated as a result of the above processing.

Next, the processing by the update variable review section 50 similar to that in the first embodiment is executed (See FIGS. 5 and 6). As a result, the contents of the reviewed update variable control table 310A do not change.

Then, the processing by the reference loop invariant expression transfer section 60 is executed. As described above, it is almost the same as that in the first embodiment except that the invariant variable detection operation (FIGS. 19 and 20) is different from that in the first embodiment (FIGS. 8 and 9), and the overall operation and the invariable expression transfer is described with referring to FIGS. 7 and 10.

At Step 701, a syntax file corresponding to the source program 1201 is opened. Then, the processing from Step 702 to Step 704 is repeated until the loop start statement 1206 is reached.

At Step 705, all columns of the variable name 411B, reference 412B, assignment 413B and change 414B on the loop variable status table 410*b* is initialized with "0". Then the invariant variable detection of Step 706 is executed (FIGS. 19 and 20).

In the invariant variable detection, the flag I to show that the conditional statement is being processed is firstly initialized with "0" at Step 1901.

Next, the update variable control table 310A is referred to. Since "1" is entered to the interrupt 315A corresponding to the second date for the position 311A, the variable name "f" registered to the variable name 313A corresponding to the second data for the position 311A is registered to the variable name 411B and at the same time "1" is entered to the change 414B at Step 1902.

The processing from Step 1903 to Step 1910 is repeated until the loop end statement 1214 is reached. After that, the same processing as the invariant variable detection operation by the reference loop invariant expression transfer section 60 according to the first embodiment above (Steps 802 to 826 in FIGS. 8 and 9) is executed (Step 1903 to Step 1927). Then, for the loop end statement 1214, it is judged to be the end of loop at Step 1904 and the invariant variable detection is terminated.

After completion of invariant variable detection, the syntax file reading position is returned to the start statement 1208 of the loop statements. Then, the invariant expression transfer processing of Step 708 is executed (See FIG. 10).

Specifically, the processing from Step 1001 to Step 1003 is repeated. Then, the assignment statement 1207 is judged to be an assignment statement at Step 1003, and transferred out of the loop at Step 1005. The assignment statement 1208 is also transferred out of the loop similarly.

For the assignment statement 1209, since it has "1" at the change column 414B corresponding to the variable name "f" at the variable name column 411B among the variable names "e", "a" and "f", "1" is entered to the column 1131 pointed by the change column 414B corresponding to the variable name "e" at the variable name column 411B at Step 1006.

For the assignment statement 1211, since the variable name "h" has "1" entered to the change column 414B corresponding to the variable name "h" at the variable name column 411B, "1" is entered to the column 1132 pointed by the change 414B corresponding to the variable name "h" at the variable name column 411B with the assignment destination variable name "h" at Step 1006.

The assignment statement 1213 is similarly processed at Step 1006 so that "1" is entered to the column 1133 pointed by the change column 414B.

For the loop end statement 1216, it is judged to be the end of loop statements at Step 1001 and the processing by the invariant expression transfer section is terminated.

When the end of syntax file is reached, the syntax file is closed at Step 709 and the processing by the reference loop invariant expression transfer section 60 is terminated.

Figures 23, 24:
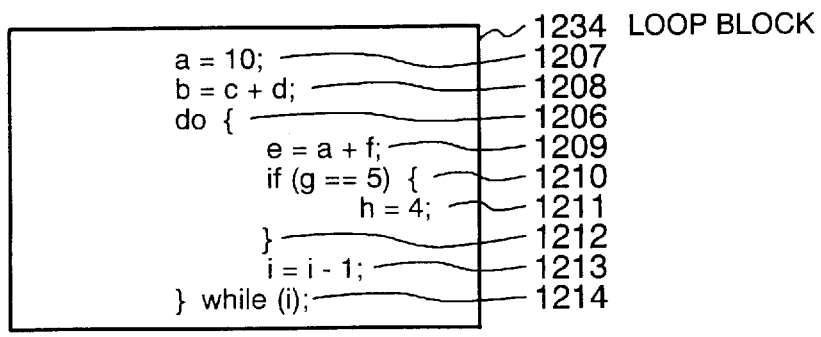
FIG. 23 is a diagram to show the loop variable status table obtained from the invariant variable detection by the reference loop invariant expression transfer section for the source program as shown in FIG. 21.
FIG. 24 is a diagram to show the optimization result of the loop block in the source program as shown in FIG. 21.

FIG. 23 shows the loop block 1234 as a result of optimization result of the loop block 1205 of the source program 1201. The figure shows that, in this embodiment, the assignment statements 1207 and 1208 in the loop block 1205 are transferred out of the loop, which could not be executed in the conventional art.

The loop block 1701 as a result of loop invariant expression transfer in FIG. 32 generated by a conventional compiler and the loop block 1234 as a result of loop invariant expression transfer in FIG. 23 generated by the compiler of this embodiment are compared below. Since the loop block 1701 according to the conventional art contains the definition of asynchronous interrupt function, the loop invariant expressions are not transferred at all, and the total number of executed statements becomes 60. In contrast, the loop block 1234 according to this embodiment recognizes th variables to be updated in the asynchronous interrupt function and transfers the loop invariant expressions, which reduces to the total number of executed statements to 32. This results in a code generation speed 1.88 times faster than the conventional speed.

As described above, in a compiler optimizing device according to the present invention, the update variable extraction section of the optimizing section for code optimization extracts the updated variables for each function contained in the loop invariant expressions and registers them to the update variable control table and the update variable review section registers the variables updated at the call destination when a call origin function calls another function to the update variable control table as the update variables, and the reference loop invariant expression transfer section extracts the loop invariant expressions based on the update variables recognized by reference to the update variable control table to transfer them out of the loop. When a source program containing function calls is optimized, the optimizing device can move the loop invariant expressions which are often executed by recognition of the variables to be changed in the call functions. This reduces the total number of executed statements and realized effective optimization, which an speed up the object code processing speed.

Further, since this optimizing device recognizes the variables to be updated in the asynchronous interrupt functions for transfer of the loop invariant expressions, it does not move the loop invariant expressions containing variables to be updated out of the loop by mistake when it optimizes a source program containing any asynchronous interrupt function. Therefore, it is not necessary to suppress transfer of the loop invariant expressions to prevent such mistake. This leads to an effective optimization with reducing the total number of executed statements, which results in a higher speed of object code processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A compiler optimizing device having a lexical analysis means to decompose a source program into lexical units, a syntactic analysis means for syntactic analysis upon receipt of lexical analysis result, an optimizing means to optimize a code by transferring loop invariant expressions, and a code generation means to generate an object code upon receipt of optimization result, said optimizing means further comprising:

an update variable control means for controlling update variables to be changed in relation to functions contained in said loop invariant expression;

an update variable extraction means for extracting the updated variables of each function contained in said loop invariant expression and registering them to said update variable control means;

an update variable review means for registering variables updated by called function when a certain function in loop invariant calls another function to said update variable control means as the update variables of calling function;

a reference loop invariant expression transfer means for extracting the loop invariant expressions based on the update variables it recognized by accessing said update variable control means and transfers them out of the loop.

2. A compiler optimizing device as set forth in claim 1, wherein said update variable control means comprises a table having at least a first item to show registration position, a second item to show function name as registration subject, a third item to show all variable names as update subjects belonging to function specified by said second item and a fourth item to show names of all functions called by said function specified by the second item and relates them for registration, and said update variable extraction means, for each of the functions contained in the loop invariant expression, specifies the registration position by said first item and registers the name of the processed function to said second item with referring to said update variable control means, extracts the variable names to be updated by assignment statements in the applicable function for registration to the corresponding position of said third item on said update variable control means and, extracts the function names called by function call statements for registration to the corresponding position of said fourth item on said update variable control means.

3. A compiler optimizing device as set forth in claim 1, wherein said update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and said update review means registers, for each of called functions corresponding to the function names registered at said fourth item of said update variable control means, the variable name of the variable to be updated by said called function to the position corresponding to said calling function at said third item of said update variable control means and, deletes the function names for which the processing has been completed from said fourth item.

4. A compiler optimizing device as set forth in claim 1, wherein said update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and said reference loop invariant expression transfer means obtains, for each function contained in the loop invariant expression, status information about the variables constituting the applicable function and, when said function calls another function, refers to registration contents at said third item of said update variable control means to recognize the variables without the status information and to supplement said variables with the status information and, extracts the loop invariant expressions based on the obtained variable status information and transfers them out of the loop.

5. A compiler optimizing device as set forth in claim 1, wherein said update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and said update variable extraction means, for each of the functions contained in the loop invariant expression, specifies the registration position by said first item and registering the name of the processed function to said second item with referring to said update variable control means, registers indication information of interrupt function to said fifth item of said update variable control means if said function whose name is registered to the second item is an interrupt function, extracts the variable names to be updated by assignment statements in the applicable function for registration to the corresponding position of said third item on said update variable control means and extracts the function names called by function call statements for registration to the corresponding position of said fourth item on said update variable control means.

6. A compiler optimizing device as set forth in claim 1, wherein said update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and said reference loop invariant expression transfer means refers to registration contents at said fifth item of said update variable control means to recognize any interrupt function among those contained in the loop invariant expression and to obtain the status information about the variable having the variable name registered to said third item corresponding to the applicable function, obtains, for each function contained in the loop invariant expression, status information about the variables constituting the applicable function and, when said function calls another function, refers to the registration contents at said third item of said update variable control means to recognize the variables without the status information and to supplement said variables with the status information and, extracts the loop invariant expressions based on the obtained variable status information and transfers them out of the loop.

7. A compiler optimization method comprising the steps of:

a lexical analysis step for to decomposing the source program into lexical units;

a syntactic analysis step for syntactic analysis upon receipt of the lexical analysis result;

an optimizing step for optimizing the code by transferring the loop invariant expressions and a code generation means to generate the object code upon receipt of the optimization result;

wherein said optimizing step further comprising:

a first step for extracting the update variables of each function contained in the loop invariant expression to register to an update change control means for controlling the update variables to be changed in relation to the functions contained in the loop invariant expressions;

a second step to register the variables updated by the called function when a certain function in the loop invariant expression calls another function to said update variable control means as the update variables of the calling function; and a third step to extract the loop invariant expression based on the update variables recognized in access to said update variable control means and to transfer them out of the loop.

8. A compiler optimization method of claim 7 wherein said update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration, and said first step to extract and register said update variables further comprises a step for specifying the registration position by said first item and to register the name of the processed function to said second item with referring to said update variable control means, a step for extracting the variable names to be updated by assignment statements in the applicable function for registration to the corresponding position of said third item on said update variable control means, and a step for further extracting the function names called by function call statements for registration to the corresponding position of said fourth item on said update variable control means.

9. A compiler optimization method of claim 7 wherein said update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration and said second step for additional registration of said update variables further comprises a step for registering, for each of called functions corresponding to the function names registered at said fourth item of said update variable control means, the variable name of the variable to be updated by said called function to the position corresponding to said calling function at said third item of said update variable control means, and a step for deleting the function names for which the processing has been completed from said fourth item.

10. A compiler optimization method of claim 7 wherein said update variable control means comprises a table having at least a first item to show registration position, a second item to show function name as registration subject, a third item to show all variable names as update subjects belonging to the function specified by said second item and a fourth item to show names of all functions called by said function specified by the second item and relates them for registration and said third step to transfer the loop invariant expressions further comprises a step for obtaining, for each function contained in the loop invariant expression, status information about the variables constituting the applicable function and, when said function calls another function, recognizing the variables without the status information by referring to the registration contents at said third item of said update variable control means and supplementing said variables with the status information, and a step for extracting the loop invariant expressions based on the obtained variable status information and transfer them out of the loop.

11. A compiler optimization method of claim 7 wherein said update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and said first step for extraction and registration of the updated variables further comprises a step for specifying the registration position by said first item and registering the name of the processed function to said second item with referring to said update variable control means for each of the functions in the loop invariant expression, a step for registering the indication information of interrupt function to said fifth item of said update variable control means if said function whose name is registered to the second item is an interrupt function, a step for extracting the variable names to be updated by assignment statements in the applicable function for registration to the corresponding position of said third item on said update variable control means, and a step for further extracting the function names called by function call statements for registration to the corresponding position of said fourth item on said update variable control means.

12. A compiler optimization method of claim 7 wherein said update variable control means comprises a table having at least a first item to show registration position, a second item to show function name as registration subject, a third item to show all variable names as update subjects belonging to the function specified by said second item, a fourth item to show names of all functions called by said function specified by the second item and a fifth item to show whether said registration subject function is an interrupt function or not and relates them for registration, and said third step for transfer of loop invariant expressions further comprises a step for referring to the registration contents at said fifth item of said update variable control means for recognition of any interrupt function among those contained in the loop invariant expression and obtaining of the status information about the variable having the variable name registered to said third item corresponding to the applicable function, a step for obtaining, for each function contained in the loop invariant expression, status information about the variables constituting the applicable function and, when said function calls another function, recognizing the variables without the status information by referring to the registration contents at said third item of said update variable control means and supplementing said variables with the status information, and a step for extracting the loop invariant expressions based on the obtained variable status information and transfers them out of the loop.

* * * * *